US010798603B2

(12) United States Patent
Chapman et al.

(10) Patent No.: US 10,798,603 B2
(45) Date of Patent: Oct. 6, 2020

(54) QUALITY OF SERVICE FRAMEWORK FOR APPLICATIONS

(71) Applicant: Cisco Technology, Inc., San Jose, CA (US)

(72) Inventors: John T. Chapman, Orange, CA (US); Jennifer Andreoli-Fang, Boulder, CO (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 16/293,427

(22) Filed: Mar. 5, 2019

(65) Prior Publication Data

US 2019/0274064 A1 Sep. 5, 2019

Related U.S. Application Data

(63) Continuation-in-part of application No. 15/456,115, filed on Mar. 10, 2017.

(60) Provisional application No. 62/638,461, filed on Mar. 5, 2018, provisional application No. 62/638,432, filed on Mar. 5, 2018, provisional application No.
(Continued)

(51) Int. Cl.
*H04W 28/02* (2009.01)
*H04W 72/14* (2009.01)
*H04W 28/24* (2009.01)
*H04W 72/12* (2009.01)
*H04W 92/02* (2009.01)

(52) U.S. Cl.
CPC ... *H04W 28/0268* (2013.01); *H04W 28/0289* (2013.01); *H04W 28/24* (2013.01); *H04W 72/1252* (2013.01); *H04W 72/14* (2013.01); *H04W 92/02* (2013.01)

(58) Field of Classification Search
CPC .......... H04W 72/1252; H04W 84/045; H04W 28/0278; H04L 12/2801; H04L 12/4625
See application file for complete search history.

(56) References Cited

U.S. PATENT DOCUMENTS

| 2003/0031161 A1 | 2/2003 | Froehlich et al. |
| 2003/0128672 A1 | 7/2003 | Komandur et al. |

(Continued)

FOREIGN PATENT DOCUMENTS

| EP | 2560323 A1 | 2/2013 |
| WO | 0119005 A1 | 3/2001 |

OTHER PUBLICATIONS

Alasti et al., Quality of Service in WiMAX and LTE Networks, May 2010, IEEE Communications Magazine, Topics in Wireless Communications (Year: 2010).*

(Continued)

*Primary Examiner* — Justin T Van Roie
(74) *Attorney, Agent, or Firm* — Merchant & Gould P.C.

(57) ABSTRACT

A quality of service framework for applications may be provided. First, a Bandwidth Report (BWR) message may be received from a first sub-system by a second sub-system. The BWR message may correspond to traffic to be received from the first sub-system by the second sub-system. Next, based on the BWR message, the second sub-system may schedule grants for the traffic to be received from the first sub-system. The second sub-system may then receive, from the first sub-system, the traffic. Then the second sub-system may transmit the traffic based on the scheduled grants.

20 Claims, 24 Drawing Sheets

Related U.S. Application Data

62/443,105, filed on Jan. 6, 2017, provisional application No. 62/405,683, filed on Oct. 7, 2016, provisional application No. 62/405,686, filed on Oct. 7, 2016, provisional application No. 62/362,033, filed on Jul. 13, 2016, provisional application No. 62/360,171, filed on Jul. 8, 2016, provisional application No. 62/357,770, filed on Jul. 1, 2016, provisional application No. 62/353,755, filed on Jun. 23, 2016, provisional application No. 62/345,634, filed on Jun. 3, 2016, provisional application No. 62/345,624, filed on Jun. 3, 2016, provisional application No. 62/339,463, filed on May 20, 2016, provisional application No. 62/306,360, filed on Mar. 10, 2016.

(56) References Cited

U.S. PATENT DOCUMENTS

| | | | |
|---|---|---|---|
| 2008/0056151 A1* | 3/2008 | Gazier | H04L 65/103 370/252 |
| 2013/0114960 A1* | 5/2013 | Goikhman | H04Q 11/0067 398/66 |
| 2014/0050095 A1 | 2/2014 | Szilagyi et al. | |
| 2017/0265216 A1 | 9/2017 | Andreoli-Fang et al. | |

OTHER PUBLICATIONS

"Cisco Visual Networking Index: Global Mobile Data Traffic Forecast Update, 2016-2021 White Paper", 2017 (9pgs.).
"Data-Over-Cable Service Interface Specifications, DOCSIS® 3.1, MAC and Upper Layer Protocols Interface Specification," Jan. 2017. (835 pgs.).
John T. Chapman, H. Jin, "Full Duplex DOCSIS," Proceedings of the INTX/NCTA Technical Forum, May 2016 (29 pgs.).
John T. Chapman, G. White, H. Jin, "Impact of CCAP to CM Distance in a Remote PHY Architecture," Proceedings of the INTX/NCTA Technical Forum, Apr. 2015 (52 pgs.).
"Backhaul Technologies for Small Cells: Use Cases, Requirements and Solutions," The Small Cell Forum, Feb. 2013 (78 pgs.).
"Coordinated multi-point operation for LTE physical layer aspects," 3GPP TR 36.819, Sep. 2013 (69 pgs.).
"Coordinated multi-point operation for LTE with non-ideal backhaul," 3GPP TR 36.874, Dec. 2013 (44 pgs.).
"5G White Paper," Next Generation Mobile Networks (NGMN) Consortium, Feb. 2015 (125 pgs.).
Measuring Broadband America 2014, FCC Office of Engineering and Technology and Consumer and Governmental Affairs Bureau, 2014 (68 pgs.).
"Perspectives on Vertical Industries and Implications for 5G," Next Generation Mobile Networks (NGMN) Consortium, Sep. 2016 (41 pgs.).
"Study on latency reduction techniques for LTE," 3GPP TR 36.881 v14.0.0, Jun. 2016 (99 pgs.).
G. White, "Active Queue Management in DOCSIS® 3.1 Networks," IEEE Comm. Mag., Mar. 2015 (18 pgs.).
"White Paper of Next Generation Fronthaul Interface," China Mobile Research Institute, et. al., Oct. 2015 (27 pgs.).
"Study on New Radio Access Technology: Radio Access Architecture and Interfaces," 3GPP TR 38.801, Mar. 2017 (78 pgs.).
"NFAPI and FAPI Specification," The Small Cell Forum, Oct. 2016 (335 pgs.).
Jennifer Andreoli-Fang, John T. Chapman, "Latency Reduction for Mobile Backhaul by Pipelining LTE and DOCSIS," unpublished (32 pgs.).
Jennifer Andreoli-Fang, John T. Chapman, "Mobile-Aware Scheduling for Low Latency Backhaul," unpublished IEEE Infocom, Apr. 2018 (9 pgs.).
Partial International Search dated Sep. 3, 2018, issued in PCT/US2018/033286 (16 pgs.).
Takashi Isobe et al: "RADIC-TCP: High-speed protocol applied for virtual private WAN" Telecommunications (ICT), 2011 18th International Conference on, IEEE, May 8, 2011 (May 8, 2011), pp. 505-510, XP031997052, DOI: 10.1109/CTS.2011.5898978 ISBN: 978-1-4577-0025-5 p. 506, right-hand column (6 pgs.).
International Search Report and Written Opinion dated Nov. 7, 2018, issued in PCT/US2018/033286 (21 pgs.).
International Search Report and Written Opinion dated May 21, 2019, issued in PCT/US2019/020814 (19 pgs.).

\* cited by examiner

1. Simple Connectivity Model

2. General Connectivity Model

3. Embedded Connectivity Model

Without BWR

With BWR

| | |
|---|---|
| Ethernet Header | 14 Bytes |
| IP Header | IPv4: 20 Bytes<br>IPv6: 40 Bytes |
| UDP Header | 8 Bytes |
| BWR Message Elements | 18 Bytes Header<br>5 Bytes Per New |
| BWR Digital Signature | TBD Bytes |
| Ethernet CRC | 4 Bytes |

FIG. 21

Common OSS System for Mobile and DOCSIS

| LCG | QCI | GTP TEID | DSCP | DSCP Meaning | BWR Flow ID | DOCSIS Service Flow |
|---|---|---|---|---|---|---|
| 0 | SRB 1/2<br>5<br>65<br>67<br>69 | | 36<br>45<br>46<br>39<br>47 | AF42<br>-<br>EF<br>AF43'<br>EF' | 0 | 1000 |
| 1 | - | | - | - | 1 | 1001 |
| 2 | 1<br>2<br>3<br>4<br>66<br>70<br>75 | | 38<br>30<br>26<br>18<br>39<br>37<br>13 | AF43<br>AF33<br>AF31<br>AF21<br>AF43'<br>AF42'<br>AF12' | 2 | 1002 |
| 3 | 6<br>7<br>8<br>9<br>79<br>80 | | 11<br>3<br>1<br>1<br>9<br>7 | AF11'<br>-<br>-<br>-<br>CS1'<br>- | 3 | 1003 |

Mobile UE

| Bearer | QCI | LCG |
|---|---|---|
| ... | ... | 0...3 |

Mobile EMB (AE)

| QCI | GTP | DSCP |
|---|---|---|
| ... | ... | ... |

DOCSIS CM

| SFID | DSCP | IP SA |
|---|---|---|
| ... | ... | ... |

DOCSIS CMTS

| SFID | BWR Flow ID |
|---|---|
| ... | ... |

FIG. 22

QUALITY OF SERVICE FRAMEWORK FOR APPLICATIONS

RELATED APPLICATIONS

This application is a continuation-in-part (CIP) of U.S. application Ser. No. 15/456,115, filed Mar. 10, 2017, which is incorporated herein by reference. Under provisions of 35 U.S.C. § 119(e), Applicant claims the benefit of U.S. Provisional Application No. 62/638,432 filed Mar. 5, 2018 and U.S. Provisional Application No. 62/638,461 filed Mar. 5, 2018, both of which are incorporated herein by reference.

U.S. application Ser. No. 15/456,115, filed Mar. 10, 2017, claimed the benefit of priority under 35 U.S.C. § 119(e) to U.S. Provisional Application Ser. No. 62/306,360, entitled "END-TO-END QOE SUPPORTED WIRELESS-WIRELINE INTEGRATION," filed Mar. 10, 2016; U.S. Provisional Application Ser. No. 62/339,463, entitled "LATENCY REDUCTION FOR LTE SMALL CELLS WITH FIXED BACKHAUL," filed May 20, 2016; U.S. Provisional Application Ser. No. 62/345,624, entitled "NETWORK CONTROLLED DYNAMIC SMALL CELL MANAGEMENT," filed Jun. 3, 2016; U.S. Provisional Application Ser. No. 62/345,634 entitled "EXPEDITED SESSION SETUP," filed Jun. 3, 2016; U.S. Provisional Application Ser. No. 62/353,755 entitled "LATENCY REDUCTION FOR VIRTUALIZED LTE SMALL CELLS WITH FIXED BACKHAUL," filed Jun. 23, 2016; U.S. Provisional Application Ser. No. 62/357,770 entitled "WIRELESS ACCESS AND WIRELINE NETWORK INTEGRATION," filed Jul. 1, 2016; U.S. Provisional Application Ser. No. 62/360,171 entitled "TECHNIQUES FOR BACKHAULING AN LTE SMALL CELL OVER A DOCSIS NETWORK," filed Jul. 8, 2016; U.S. Provisional Application Ser. No. 62/362,033 entitled "PIPELINING HARQ RETRANSMISSIONS FOR SMALL CELL BACKHAUL," filed Jul. 13, 2016; U.S. Provisional Application Ser. No. 62/405,683 entitled "CMTS GRANT MATH FOR LATENCY REDUCTION FOR VIRTUALIZED LTE SMALL CELLS WITH FIXED BACKHAUL," filed Oct. 7, 2016; U.S. Provisional Application Ser. No. 62/405,686 entitled "HARQ RETRANSMISSION PIPELINING FOR TRADITIONAL ENB AND VIRTUALIZED SMALL CELL WITH FIXED BACKHAUL," filed Oct. 7, 2016; and U.S. Provisional Application Ser. No. 62/443,105 entitled "PACKET SEGMENTATION IN STANDALONE SMALL CELL," filed Jan. 6, 2017. The disclosure of the prior applications are considered part of (and are incorporated by reference in) the disclosure of this application.

TECHNICAL FIELD

The present disclosure relates generally to a quality of service framework.

BACKGROUND

Communication networks are designed with their own scheduling algorithms and their own ways to provide Quality of Service (QoS). When putting multiple networks together as an end-to-end communication system, either with the networks of different types or even the same type, such as for the purpose of xhauling wireless traffic, there can be un-necessarily long latency.

BRIEF DESCRIPTION OF THE FIGURES

The accompanying drawings, which are incorporated in and constitute a part of this disclosure, illustrate various embodiments of the present disclosure. In the drawings:

FIG. 21 illustrates a BWR packet format;
FIG. 22 illustrates a transport network and AE provisioning model.

DETAILED DESCRIPTION

Overview

Figure 1:
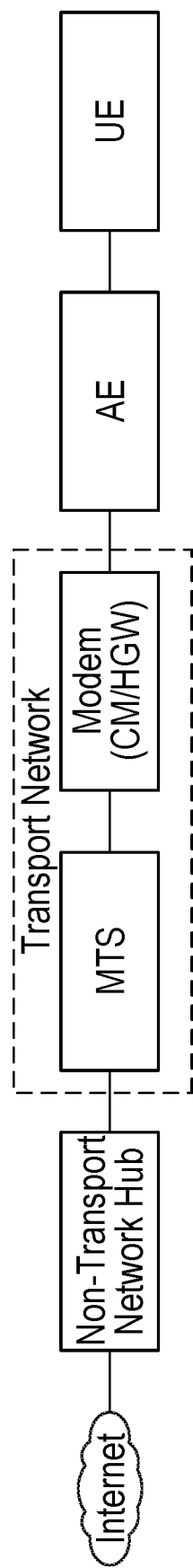
FIG. 1 illustrates an access entity definition in a backhaul scenario.

A quality of service framework for mapping the QoS between two or more sub-systems that are part of an end-to-end communication system is provided. Furthermore, a method to reduce latency on the network using the QoS mapping is described.

The QoS mapping framework describes a way for a first sub-system to expose the QoS metrics (such as QoS identifier or others) to the second or third sub-systems so that they can provide proper QoS guarantees on their respective sub-system, resulting in consistent or near-consistent QoS across the entire system.

For latency reduction, a Bandwidth Report (BWR) message is sent from a first sub-system and received by a second sub-system. The BWR message describes the traffic to be sent from one or more UEs to the AE in the first sub-system, which will then pass to the second sub-system. Based on the BWR message, the second sub-system may schedule one or more second sub-system (SSS) grants for transmitting traffic associated with the BWR message from the first sub-system across the second sub-system. The second sub-system transmits the traffic based on the scheduled SSS grants. In other words, the BWR message describes the traffic to be sent across the second sub-system, before the traffic actually arrives at the second sub-system. The BWR message is essentially a summary of the grants provided by the AE to a plurality of the devices it supports within the first sub-system. The second sub-system may then utilize the BWR messages to ensure SSS grants are in place around the time the traffic has arrived from the first sub-system. Described another way, the BWR message is a mechanism of the first sub-system to indicate to the second sub-system of what will come in the future. Described yet another way, embodiments of the disclosure may start the request-grant loop in second sub-system early and in parallel, before the request-grant loop in the first sub-system's grant process is completed. In this way, the overall latency for the end-to-end system may be reduced.

This application intends to cover how QoS mapping and latency reduction can be achieved when an end-to-end communication system is comprised of two or more sub-systems that typically do not have visibility from one sub-system into the other. The end-to-end communication system is comprised of a first sub-system, the non-transport network, and one or more second sub-system(s), the transport network. The transport network transports traffic for the non-transport network from the AE to a non-transport network hub, through an MTS such as CMTS or Optical Line Termination (OLT) or others. The non-transport network hub can be a mobile core, a CMTS if the non-transport network is a cable network, or an OLT if the non-transport network is an optical network.

The concept may be used for backhaul, midhaul, or fronthaul various types of non-transport networks such as DOCSIS, PON (EPON, GPON, SIEPON), 4G, 5G, Wi-Fi, or satellite, etc., using various types of transport networks such as DOCSIS, PON, 4G, 5G, Wi-Fi, IAB (integrated access backhaul), or satellite, etc. These are meant to be examples only, and the skilled artisan would understand the idea presented here may apply to other transports and non-transport networks.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Embodiments of the disclosure may comprise a method for Quality of Service (QoS) mapping between at least two communication sub-systems that together make an end-to-end communication link. The method may comprise receiving at a first sub-system (FSS) receiver, one or more Requests (REQ(s)) (e.g, a BSR) describing a request to transmit a first data via one of a plurality of FSS traffic flows selected from a group of FSS traffic flows. The method may further comprise generating one or more FSS grants based on the received REQ(s). Prior to the receipt of the first data, the method may include associating the first data's FSS traffic flow (e.g., LC or LCG) with a second subsystem (SSS) readable data, e.g., one or more of a DiffServ Code Point (DSCP), a 802.1Q header (which includes one or both of a VLAN tag/ID and a Priority Code Point (PCP)), and any other QoS identifiers, associated to a SSS traffic flow (e.g., SFID(s)) selected from a group of SSS traffic flows, wherein each SSS traffic flow is configured with different SSS transmission parameters (e.g., QoS). In addition, the method may include generating a SSS readable header based on and reflecting the SSS readable data, e.g., one or more of a DSCP, a 802.1Q header (which includes one or both of a VLAN tag/ID and a Priority Code Point (PCP)), and any other QoS identifiers, and appending the received first data based with the generated SSS readable header to form appended first data such that the SSS may transmit the appended first data via the appropriate SSS traffic flow(s) (e.g., SFID(s)).

The FSS traffic flows and the SSS traffic flows may have different transmission parameters. The number of FSS traffic flows may not be equal to the number of SSS traffic flows. The FSS transmission parameters may comprise QoS class identifiers (QCIs). At least two of the FSS transmission parameters may have different latency requirements and at least two of the SSS transmission parameters may have different latency requirements. At least two of the transmission parameters may have different jitter requirements.

The step of associating the FSS traffic flow to the SSS traffic flow may be based on a dynamically determined closeness matching function. The step of associating the FSS traffic flow to the SSS traffic flow may be based on a predetermined mapping. One or more FSS traffic flows may be mapped to one of the SSS traffic flows. One or more FSS transmission parameters is mapped to one SSS transmission parameter. The method may further comprise the SSS performing the step of deriving data associated with the FSS transmission parameter(s) from the SSS readable header to transmit the appended first data via a corresponding SSS traffic flow. The SSS may perform the step of mapping one or more FSS transmission parameter to one of the SSS traffic flows.

The appended data includes an Internet Protocol (IP) header. The IP header may include a Differentiated Services Code Point (DSCP) field associated with one or both of the FSS transmission parameter and the FSS traffic flow. The FSS performs the step of mapping a QoS Class Identifier (QCI) associated with the first data to the DCSP in the IP header. The FSS performs the step of mapping one or both of Logical Channel Groups (LCGs) and Logical Channels associated with the FSS received data to the DCSP in the IP header.

The appended data includes an Ethernet header. The Ethernet header may include a Virtual Local Area Network (VLAN) field associated with the one or both of the FSS transmission parameter and the FSS traffic flow. The FSS may performs the step of mapping a QoS Class Identifier (QCI) associated with the FSS received data to the VLAN. The FSS may perform the step of mapping one or both of a Logical Channel Group (LCG) and a Logical Channel (LC) associated with the FSS received data to the VLAN.

The SSS may perform the function of xhauling data for the FSS. Xhauling may be selected from the group consisting of fronthauling, backhauling, and midhauling. The BWR message may include one or more of a scheduled time data associated with each grant, a BWR flow ID, and a number of bytes per BWR flow ID. The SSS may provide a communication link between a first portion of the FSS and a second portion of the FSS. The first portion of the FSS is an Access Entity (AE) and the second portion of the FSS is a non-transport network hub. The first portion of the FSS is an Access Entity-Remote Unit (AE-RU) and the second portion of the FSS is an Access Entity-Distributed Unit (AE-DU). The second portion of the FSS further comprises an Access Entity-Central Unit (AE-CU). Each FSS traffic flow is configured with a different FSS (e.g., QoS) transmission parameter.

Embodiments of the disclosure may comprise a method for generating a second sub-system (SSS) BandWidth Report (BWR) message on a first sub-system (FSS) for communication to and utilization by a second sub-system (SSS) to reduce end-to-end latency. The method may comprise receiving an Access Entity (AE) within the FSS, one or more buffer status reports (BSRs) from one or more devices associated with the FSS and generating a FSS grant for each received BSR. The method may further comprise generating, at the AE, the SSS BWR message based on the generated FSS grants and transmitting, from the FSS to the SSS, the SSS BWR message such that the SSS may generate a SSS network grant for the xhauling of FSS data substantially close in time to the receipt of the FSS data at the AE as represented by the FSS grant.

The BWR message includes one or more Quality of Service (QoS) categories for each associated FSS grant. The SSS network grant includes two or more grants having different QoS categories associated with the QoS categories in the BWR message. The BWR includes one or more of an IP header, an Ethernet header, TCP Header, Content Centric Network (CCN) header, and a UDP header. A BWR Header includes one or more of a version number, sequence number, AE identifier, timestamp of the BWR message, BWR table size, and one or more BWR Rows. Each BWR Row includes one or more of a BWR offset, BWR Flow ID, and bytes requested. The BWR message includes a BWR signature. The BWR signature may comprise a digital signature.

In exemplary one embodiment, the present systems and methods include a transport system/network (e.g., a fronthaul network, backhaul network, mid-haul network, x-haul network) having a modem in communication with a a Modem Termination System (MTS) utilizing a DOCSIS communication link. In such or similar (see below) an embodiment the modem detects a message from a wireless service link, for example from a user equipment (UE) via small cell, indicating that the UE has data to transmit to a Mobile Network Operator (MNO). Other embodiments contemplated utilize an optical network. An optical network may be formed with, for example, an Optical Network Terminal (ONT) or an Optical Line Termination (OLT), and an Optical Network Unit (ONU), and may utilize optical protocols such as PON, EPON, RFOG, GPON, access network coherent optics, or similar or future variants.

Embodiments also contemplated exist in other communication systems capable of transporting/x-hauling traffic, for example, a satellite operator's communication systems, DSL and its variants (e.g., ADSL, VDSL, and SHDSL), etc. It should also be understood that the transport system need not be a wireline system or network. For example it is contemplated that the transport system/network may be or utilize a wireless backhaul, fronthaul, mid-haul, x-haul technology such as but not limited to point-to-point wireless systems, point-to-multipoint wireless systems, multi-hop wireless systems, etc. such as that described by 3rd Generation Partnership Project (3GPP™) in, e.g., 3G, 4G, 5G, its variants and its future embodiments, and the Institute of Electrical and Electronics Engineers' (IEEE's) in 802.11 implemented in whole or in part in a backhaul embodiment. To simplify description, a termination unit such as a CMTS, an ONT, an OLT, a Network Termination Units, a Satellite Termination Units, and other termination systems are collectively called a "Modem Termination System (MTS)". To simplify description a modem unit such as a satellite modem, a cable modem (CM), an Optical Network Units (ONU), a DSL unit, etc. are collectively called a "modem." Further, to simplify description transport/x-haul protocols such as DOCSIS, EPON, RFOG, GPON, Satellite Internet Protocol, DSL protocols, are called a "protocol." Furthermore, some embodiments are described here from a DOCSIS/Cable Technology perspective, but this is merely to simplify the description, is only meant to be an example, and is not meant to be limiting in any way. It is contemplated that the present systems and methods may be applies to any number of multiple networks, even two networks utilizing the technology but having separate schedulers, such as a first DOCIS network owned by a first operator and a second DOCSIS network owned by a second operator. The skilled artisan will be capable of reading the present disclosure and make the necessary adaptations for the present systems and methods to be advantageously applied to the other related networks.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Embodiments of the disclosure may provide a Quality of Service (QoS) framework for transport networks (e.g., Wireless, PON, HFC, etc.) to provide enhanced services for non-transport networks. New market opportunities for transport technology may include carrying wireless non-transport network traffic such as mobile backhaul, midhaul, and fronthaul. These wireless traffic may require certain key performance indicators (KPIs), such as latency, on the transport portion of the overall network. Embodiments of the disclosure may provide requirements on transport and non-transport (e.g., mobile) network equipment for matching QoS and reducing upstream latency over the transport network for carrying non-transport network traffic.

The aforementioned transport network may utilize a Data Over Cable Service Interface Specification (DOCSIS) protocol, and any of its variants (e.g., DOCSIS 3.0, DOCSIS 3.1, C-DOCSIS, etc.) and future developments. DOCSIS may comprise an international telecommunications standard that may permit the addition of high-bandwidth data transfer to an existing HFC system. While embodiments of the disclosure may be described in the context of DOCSIS, embodiments of the disclosure are not limited to DOCSIS and may be applicable to other access network types, for example, Ethernet Passive Optical Network (EPON), GPON, SIEPON, Gigabit PON, Radio Frequency Over Glass Fiber, (RFOG), DSL, etc. Similarly, the aforementioned non-transport network may be described in the context of mobile networks comprising, but not limited to, 4G Long-Term Evolution (LTE) broadband cellular network applications, Fifth Generation (5G) broadband cellular network applications, or Wi-Fi.

A mobile backhaul network (MBH) may comprise a network providing connectivity between a mobile switching core (e.g., Evolved Packet Core (EPC) for LTE, the 5G core, the 6G core, Wi-Fi Core or the like) and a Radio Access Network (RAN). As the mobile industry moves to disaggregate the radio access stack into lower layer Remote Units (RUs) located at cell sites and the more centrally located higher layer processing Distributed Units (DUs), mobile fronthaul refers to the link between the RU and the DU. The Central Units (CUs) refer to even higher layer of the traditional radio access stack. Midhaul refers to the link between the DU and the Central Unit (CU). Embodiments of the disclosure may provide the QoS framework and may be applicable to backhaul, midhaul, and fronthaul.

Embodiments of the disclosure may allow transport network operators such as cable or PON operators to take advantage of their systems' infrastructural assets to provide economical and capable mobile xhaul services that may be comparable to fiber, either for their own mobile traffic, or for providing backhaul, midhaul, or fronthaul services to other mobile operators.

In a cellular network, backhaul refers to a portion of a network that runs between a base station (e.g., an eNB) to the mobile core network. Fronthaul may comprise the network link between remote radio heads at cell sites and a centralized baseband controller. Backhaul and fronthaul may be referenced together as xHaul.

A macrocell may comprise a cell in cellular networks that may provide radio coverage served by a powered cellular base station. A small cell may comprise a low-powered cellular radio access node that may operate on licensed or unlicensed spectrum that may have a range, for example, of 10 meters to a few hundred meters.

QoS Matching and Latency Reduction (Bandwidth Report (BWR) Protocol)

A use case of a Bandwidth Report (BWR) protocol used in backhauling an LTE eNB may be described as follows. While LTE examples are described, the use case may be applicable to other medias such as, 4G, 5G, 6G, Wi-Fi, HFC, PON, or any other systems. The BWR protocol may be used for both fronthaul, midhaul, and backhaul use cases.

FIG. 1 illustrates an access entity definition in a backhaul scenario. The system of FIG. 1, may include a Modem Termination System (MTS) which can be a Cable MTS (CMTS) and a Modem which can be a Cable Modem (CM)/Home Gateway (HGW). Backhauling a first non-transport sub-system over a second transport sub-system may apply to at least the following scenarios: i) an LTE eNodeB (eNB) small cell or macrocell backhaul over DOCSIS; ii) a 5G gNB small cell or macrocell backhaul over DOCSIS; and iii) an 802.11ax Wi-Fi Access Point (AP) backhaul over DOCSIS. The external entity in these three use cases may be generically referred to as an Access Entity (AE). The AE may also implement any other type of communication protocol such as DOCSIS, PON, or satellite. The AE may be the master of the non-transport access network, and that the mobile air interface resource scheduler may reside in the AE.

Figure 2:
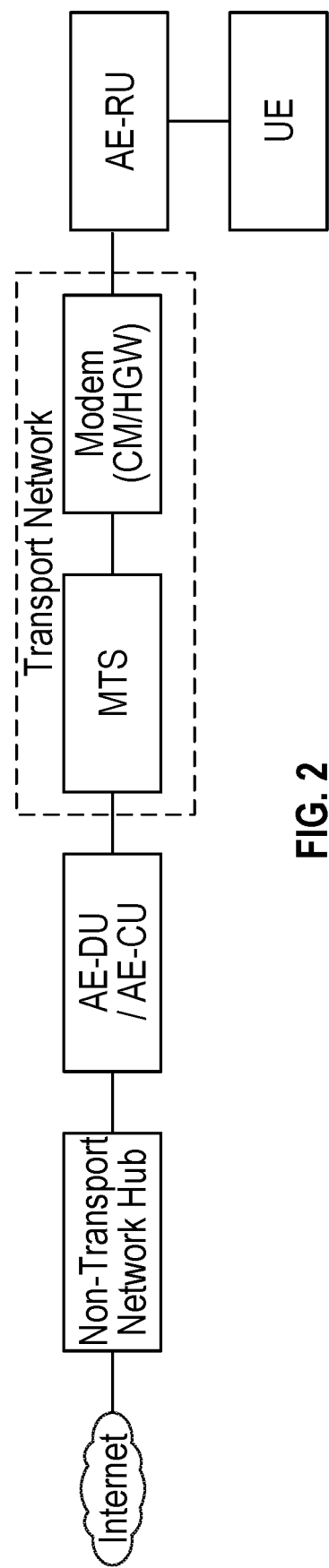
FIG. 2 illustrates access entity in fronthaul scenario.

In the case of fronthauling a first non-transport sub-system over a second transport sub-system, a portion of a traditional node may be virtualized into a Central Unit (CU) or a Distributed Unit (DU), with minimal functionality residing in a Remote Unit (RU). The AE may be split between the CU/DU portion and the RU portion, namely AE-CU and AE-DU. For some lower layer split use cases, the air interface resource scheduler may reside in the AE-CU/AE-DU as illustrated in the AE in fronthaul scenario of FIG. 2.

Figure 3:
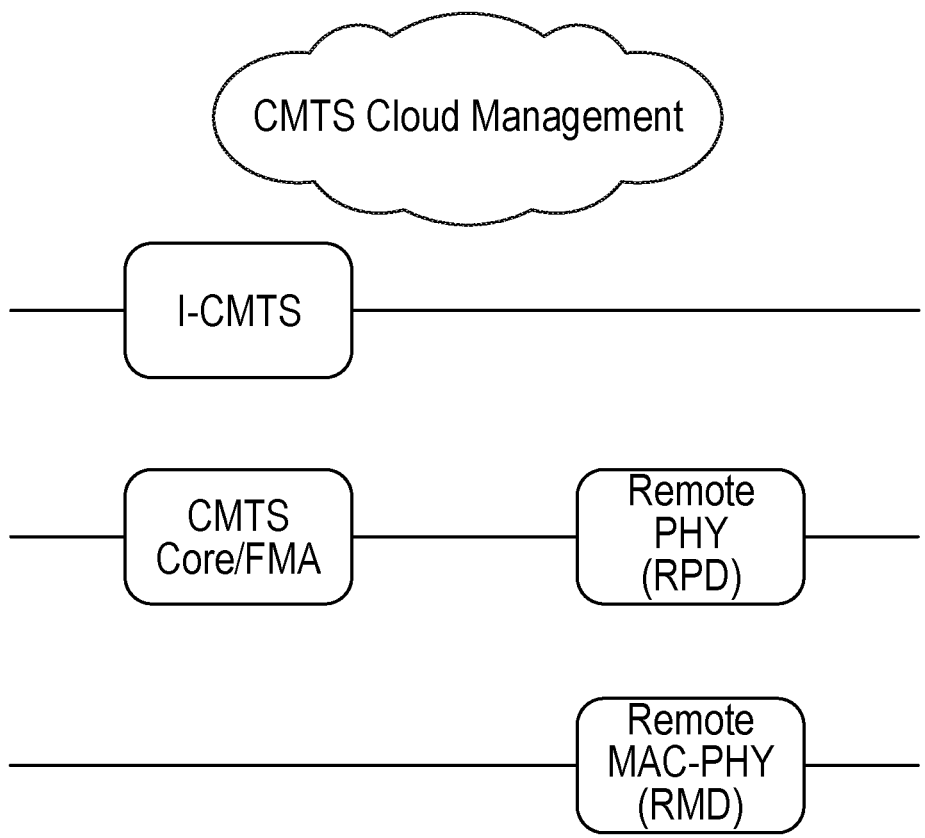
FIG. 3 illustrates a Modem Termination System (MTS)

DOCSIS systems may comprise a CMTS and a Cable Modem (CM). As illustrated in FIG. 3, the CMTS may be packaged as an integrated CMTS, a Distributed Access Architecture (DAA) system with a CMTS Core and a Remote PHY, or DAA Remote MACPHY. These options are shown in FIG. 3. The CMTS scenarios may comprise: i) an integrated CMTS; ii) CMTS Core with a DAA Remote PHY Device (RPD); and a DAA Remote MACPHY (RMD) which can include a Flexible MAC architecture (FMA).

A DOCSIS CM may comprise a Home Gateway (HGW) device, also called a Fixed Network-Remote Gateway (FN-RG). The HGW device may include or be in communication with a DOCSIS CM and a router with an embedded Dynamic Host Configuration Protocol (DHCP) server, Network Address Translation (NAT), and Firewall functions. These functions may impact the signaling choices available to an AE. The HGW may also comprise or be in communication with an independent Wi-Fi access point. Some variations in CM connectivity are illustrated in FIG. 4A, FIG. 4B, and FIG. 4C.

Figure 4A:
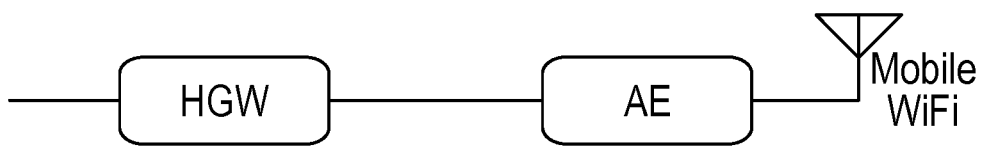
FIGS. 4A, 4B, and 4C, illustrate modem connectivity.

FIG. 4A illustrates a connectivity model where an HGW directly and solely connects to an AE. This scenario may be likely when the CM and the AE are collocated in a strand-mount enclosure for example.

Figure 4B:
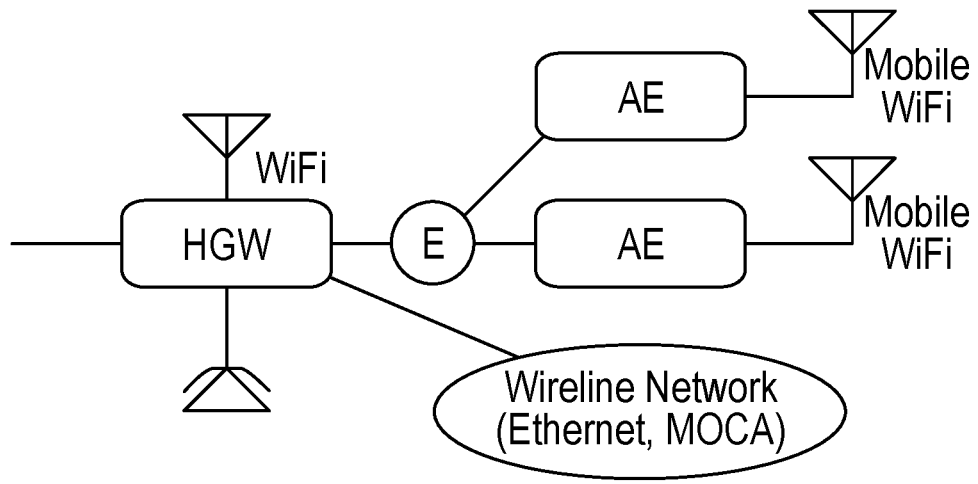

FIG. 4B illustrates a connectivity model in which an HGW may be directly connected to an AE in addition to a local network. The local network may have its own Wi-Fi, Ethernet, and Multimedia over Coax Alliance (MOCA) connectivity as well as Voice-over-IP (VoIP). This may comprise a case for deployment in a residential environment. An extension of this model may be to have multiple AEs to service multiple rooms in a home or for business environments. The multiple AEs may be connected to an internal Ethernet switch, external Ethernet switch, or daisy-chained.

Figure 4C:
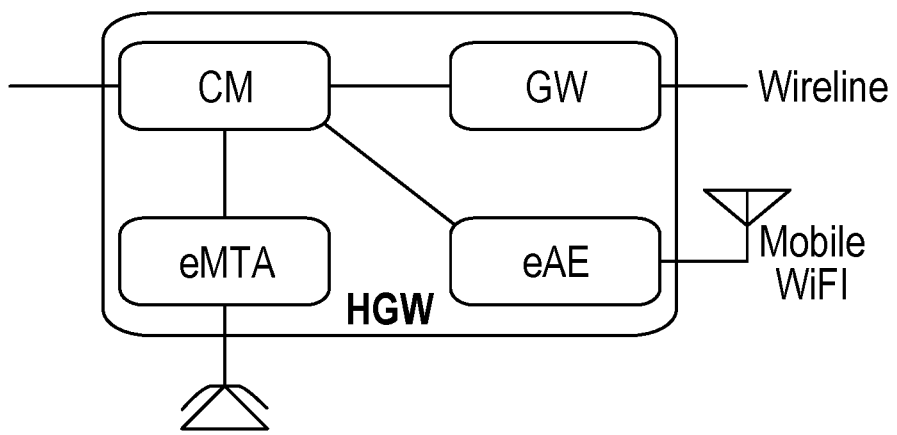

FIG. 4C illustrates an embedded connectivity model comprising an HGW with an embedded AE. In this case, the AE may connect directly to the CM and may bypass the embedded router and DHCP server. With multiple AEs, some may be embedded while others may be external.

Figure 5:
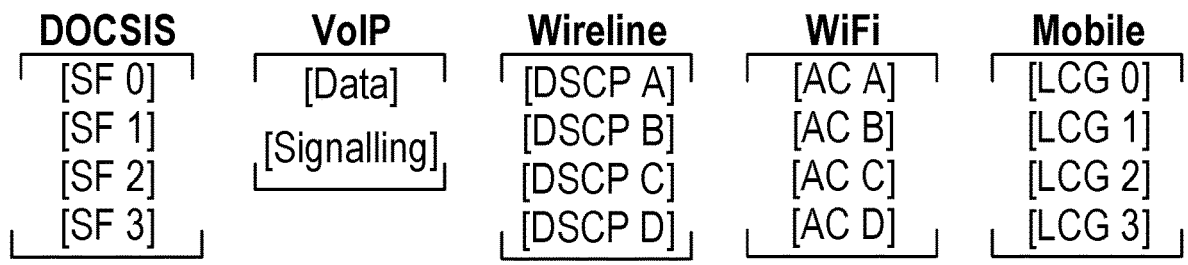
FIG. 5 illustrates uniform Quality of Service (QoS)

FIG. 5 illustrates how each type of network may have different ways to label QoS. For example, a wireline network such as DOCSIS or PON may utilize a QoS tag such as DiffServ Code Points (DSCPs), virtual LAN (VLAN) tags, an identifier for example assigned by the operator, and/or similar, whereas a mobile network such as LTE may utilize Logical Channel Groups on the air interface but QoS Class Identifier (QCI) on the eNB to EPC interface. For QoS matching between 2 or more networks to work, one network may need to expose its QoS in the language that the other networks can understand. This may be in terms of one or more of a DSCP, a 802.1Q header (which includes one or both of a VLAN tag/ID and a Priority Code Point (PCP)), any other QoS identifiers, and an identifier negotiated between the different network operators, and/or similar. Environments of the disclosure may contain multiple endpoints and multiple connectivity scenarios. The significance of this may be that traffic from endpoints over local forms of connectivity (e.g., eNB/gNB, Wi-Fi, and Ethernet) may backhaul over a common DOCSIS network. The traffic may converge at the CM from the devices and may need to follow a set of QoS rules. Policy choices may have to be made regarding which packets go on which DOCSIS service flows.

Figure 6:
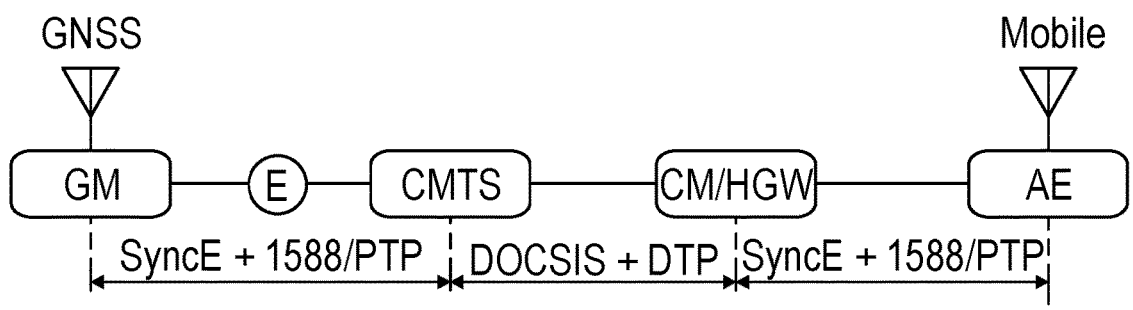
FIG. 6 illustrates system timing and definition.

FIG. 6 illustrates system timing and definition. To effectively couple scheduling information between the AE and the DOCSIS system, a common time reference at the transport and the access network schedulers may be required. This may be achieved by using Global Navigation Satellite System (GNSS) receivers at the AE and the CMTS/CMTS core/RMD/FMA, implementing IEEE 1588 at the AE and the CMTS/CMTS core/RMD/FMA, or having the CMTS learn the AE system frame/slot timing, and/or similar. For the fronthaul case, this may be achieved by using GNSS receivers at the AE-DU and the CMTS/CMTS core/RMD/FMA, implementing IEEE 1588 at the AE-DU and the CMTS/CMTS core/RMD/FMA, or having the CMTS learn the AE system frame/slot timing, and/or similar.

Figure 7:
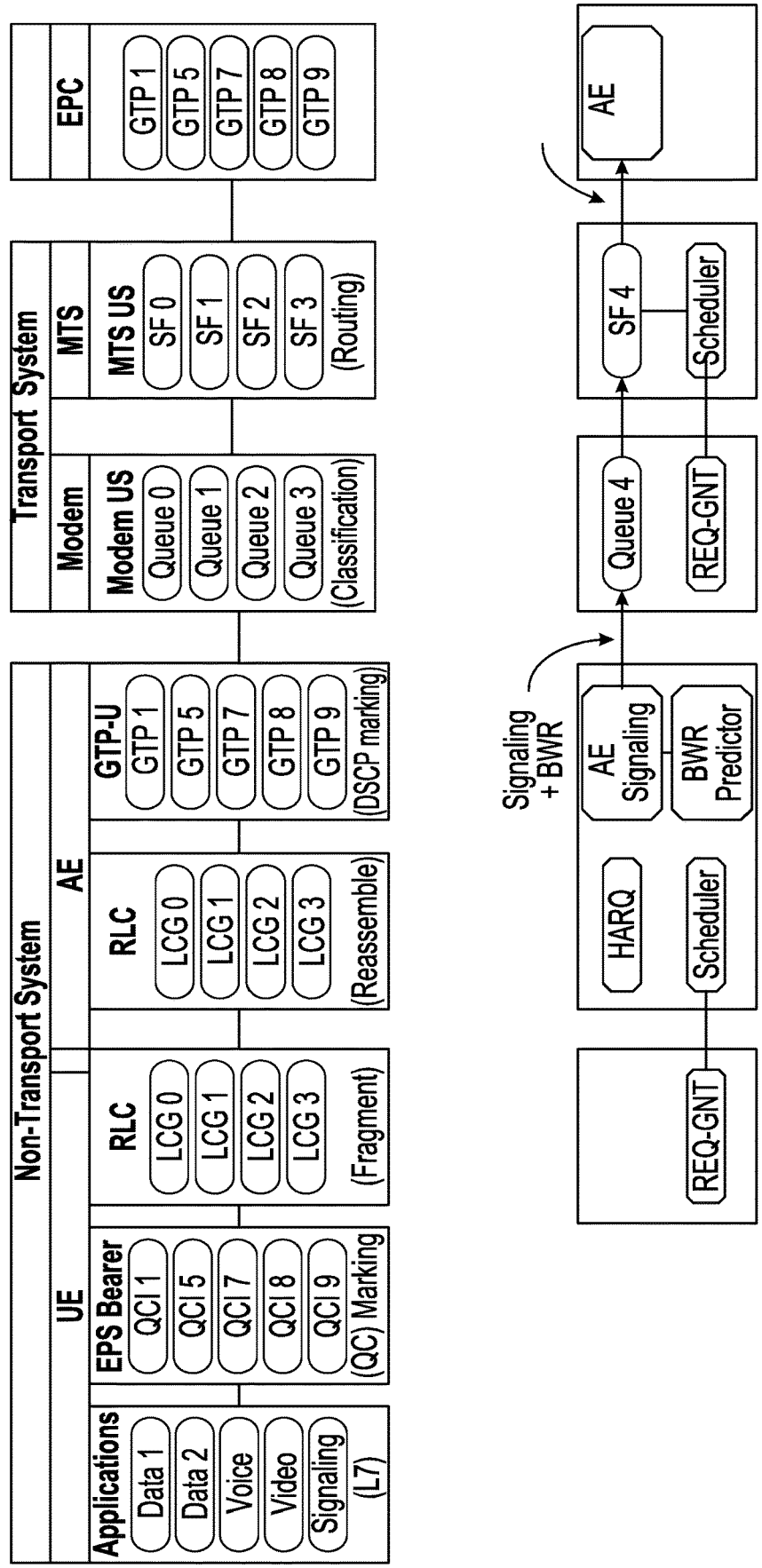
FIG. 7 illustrates a QoS model of mobile backhaul over a transport network.

FIG. 7 illustrates a QoS matching model of mobile traffic transported over a transport network. An non-transport system example is shown with the flow of packets that flow from a source in User Equipment (UE) to a destination in an EPC past the MTS in a simplified network. An LTE RAN may be connected to the EPC using DOCSIS as backhaul. The non-transport network may comprise the UE and an AE that comprise their respective sub-systems. The transport network may comprise a modem and the MTS. In today's system, the transport network may not have the visibility into the non-transport access network, and may not understand the level of QoS needed for different types of access network traffic. The detail of how the transport network can match the QoS of the non-transport access network will be described below. The same idea may be generalize to a backhaul system having a modem and an MTS, as discussed above.

FIG. 7 shows three interfaces: i) UE to AE interface, e.g., air; ii) AE to modem interface, e.g., Ethernet (i.e., twisted pair or optical); and iii) interface within transport system, e.g., HFC (i.e., coax and fiber). The UE-AE interface may be internal to the non-transport network. The intra-transport interface may be internal to the transport network. However, the AE-modem interface, may be a different type of interface. This may mean that QoS should be maintained and matched between the non-transport network and the transport network.

Starting on the left side of FIG. 7, there may be a number of applications from which the UE may initiate data flows. It may be that one or more UE applications are running and sending traffic as a result of one or more flows initiated outside of the EPC system by an internet server. There may be any number of applications that span the classic realms of data, voice, video, and signaling. Each of these may generate Transmission Control Protocol (TCP) or User Datagram Protocol (UDP) flows for example. The Non-transport network may map these applications into Evolved Packet System (EPS) bearers/flows and may assign each of these flows with a QoS Class Identifier (QCI). The transport network, e.g., a Transport network, may not have the visibility into the QCIs, and may not understand the meaning of QCI.

The EPS bearers may be mapped into logical channels on the air interface. One or more logical channels may be collectively mapped into a Logical Channel Group (LCG) on the air interface to facilitate efficient use of bandwidth for UE bandwidth requests on the radio (i.e., air) link. This may be important because there may only be a maximum of four LCGs, but there may be more than four EPS bearers per UE. UE signaling may be included in one of these LCGs, for example, LCG 0. The LTE buffer status report from the UE may be based on LCGs.

A grant from the AE may be a single grant for all four LCGs, but may be subject to a set of rules that may align the grant with the original request while allowing for newly arrived higher priority packets to be accommodated.

The UE may fragment packets across its air interface. The segments may be received at the AE and reassembled back into packets. The AE may treat some or all EPS flow differently, i.e., the AE may provide differentiated QoS for the EPS flows. This may result in different delays for different EPS flows. The AE may map each EPS flow into an S1 GPRS Tunneling Protocol (GTP) tunnel, and may further encapsulate the GTP tunnel with another, i.e., outer, IP header for routing to the EPC. Each IP-encapsulated GTP tunnel may be assigned a DiffServ Code Point (DSCP), as indicated in the outer IP header to indicate the desired QoS on the transport portion of the system between the AE and the EPC. It is possible that a Layer 2 network resides between the transport network and the EPC/mobile core. In such case, a 802.1Q header, which includes one or both of a VLAN tag/ID and a Priority Code Point (PCP), or any other QoS identifier(s), may be used to indicate the desired QoS on the transport portion. In fact, other forms of QoS identifier may be used so long as the AE maintains the proper mapping and the QoS identifier can be understood by the transport network. The AE may maintain the mapping of each EPS flow, its associated GTP Tunnel Endpoint ID (TEID), its associated QCI, and one or more of its associated outer DSCP, its associated 802.1Q header (which includes one or both of VLAN tag/ID and Priority Code Point (PCP)), and any other of its associated QoS identifier. It is possible that multiple EPS flows, and therefore multiple GTP TEIDs can be assigned to the same QoS identifier, e.g., outer DSCP. The mapping between QCI and the QoS identifier, e.g., outer DSCP, may be configured by an operator, and/or may be negotiated between a mobile and a transport operator. Furthermore, the QoS identifier, e.g., outer DSCP, may be dynamically configured and reconfigured, depending on a number of reasons but not limited to user upgrades, preemption, 911, time of day, traffic loading, re-negotiation between the mobile and the transport operators, etc.

Furthermore, certain signaling messages, such as AE-to-AE signaling, may be encapsulated in the Stream Control Transmission Protocol (SCTP), may not have an associated QCI, and in such cases, the QoS identifier, e.g., outer DSCP, may still be assigned by the AE to indicate desired QoS that may be matched by the transport network. Similar to the previous case of non-signaling traffic, the QoS identifier, e.g., outer DSCP, may be operator-configured, negotiated between operators, and/or dynamically reconfigured, etc. Furthermore, although an LTE and DOCSIS example was given, the non-transport access network and the transport network may be other types of communication networks such as a 5G network, a DOCSIS network, a Wi-Fi network, etc.

The IP packet encapsulating the GTP tunnel may arrive at the modem and may be mapped to a service flow using a classifier. The classification may be done with outer IP address, outer DSCP, and/or protocol type such as SCTP. When a grant arrives at the modem upstream, the complete IP packet encapsulating the GTP portion may be sent to the MTS. The MTS may forward the packet across an IP network and the GTP packet may eventually terminate at a Packet Data Network Gateway (PDN-GW, or simply PGW) of the Evolved Packet Core (EPC). From there, the contents of the GTP packet, i.e., the inner IP packet wrapped inside the GTP tunnel, which may be the original packets from the application in the UE, may be forwarded on to their final destination. The EPC may comprise a Serving Gateway (SGW), a PGW, and a Mobile Management Entity (MME). In the case of a 5G network, the encapsulated GTP tunnel may be sent to the user plane function (UPF), before being forwarded to the final destination.

The BWR process may comprise an AE prediction process that may gather information from the LTE scheduler, HARQ, a reassembly engine, and other status blocks to generate a Bandwidth Report (BWR) message. The BWR message may comprise a request message intended to describe future egress traffic behavior on the Ethernet port of the AE. The BWR message may be for example a layer 3 message. The BWR process may also gather information about the expected latency for bytes to traverse from the PHY layer up to the Ethernet port. The BWR message may be received at the modem and classified to a service flow. When a grant arrives for that service flow, the BWR message may be transported to the MTS and delivered to a MTS predictor process that may decode the BWR information and decides when in the future that grants from the MTS should be sent to the modem on a particular service flow.

In addition to the EPS bearer traffic, there may be signaling traffic originated at the AE and X2 traffic such as to enable features like Enhanced Inter-Cell Interference Coordination (eICIC) and Coordinated Multipoint (CoMP). Signaling traffic that originates at the UE may be accounted for with the BWR message since that signaling may need to be scheduled by the AE scheduler and be accounted for in the AE grants. Signaling traffic that is generated by the AE in real-time may not be accounted for in the BWR message and may require separate QoS treatment at the modem. In some cases, the AE scheduler may know in advance when AE-generated signaling will be generated and sent. In such cases, these signaling traffic may be accounted for in the BWR message.

eICIC and CoMP are examples of X2 signaling traffic that are sent from AE to AE. The desired latency may need to be 5 ms or less for CoMP to be able to show significant performance gain. To achieve this latency budget where each AE is behind a separate modem, embodiments of the disclosure may provide a latency distribution of 2 ms for the DOCSIS upstream, 1 ms for the DOCSIS downstream, and 2 ms for the rest of the network. If QoS is matched throughout the entire network path, this latency target should be achievable.

Figure 8:
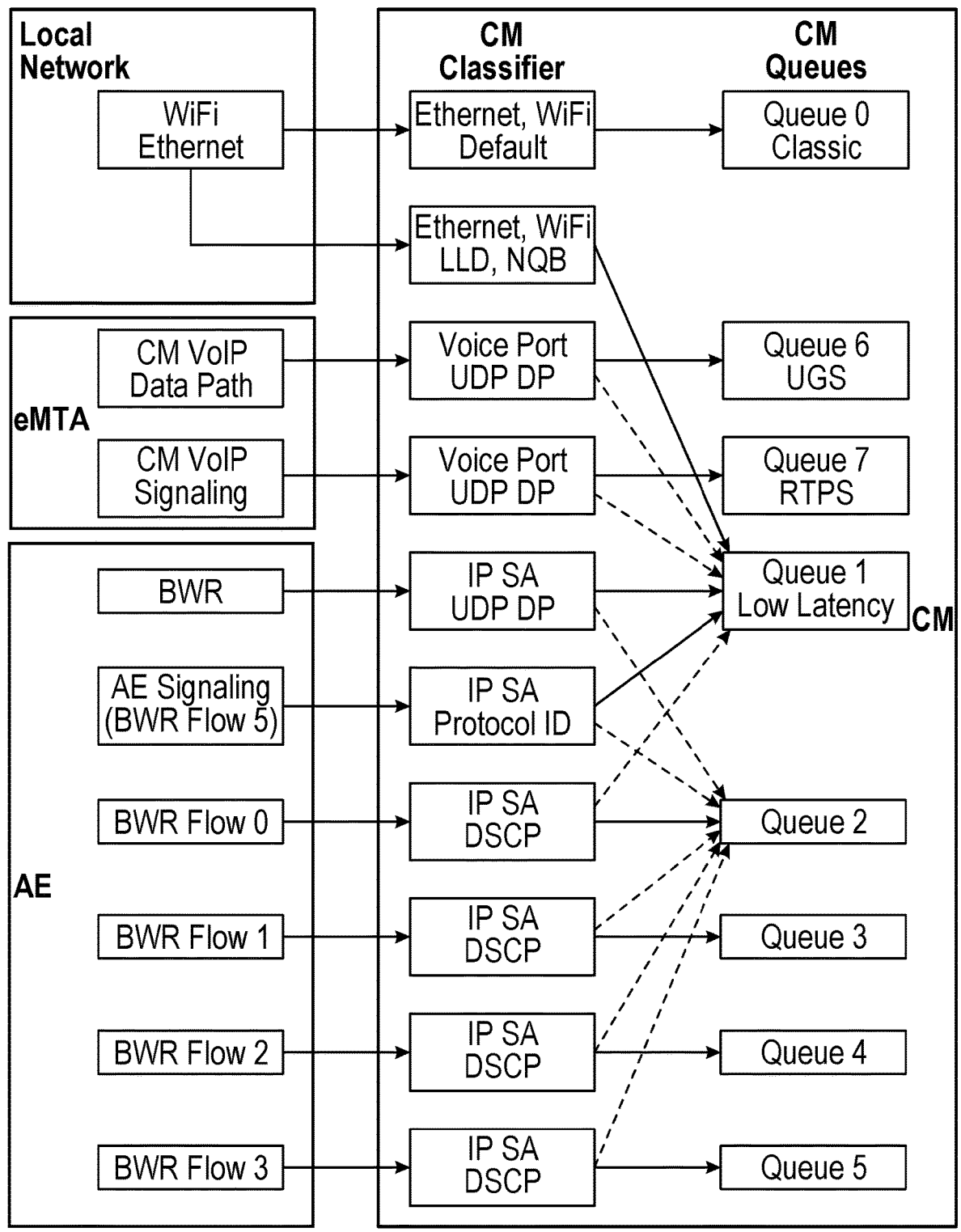
FIG. 8 illustrates classifiers for QoS framework for in the exemplary embodiment of a Long-Term Evolution (LTE™) Access Entity (AE)

FIG. 8 illustrates QoS framework and how various types of traffic are mapped between a non-transport access network and a transport network. Recall an AE is an access entity that may implement communication protocols including but not limited to 5G, LTE, Wi-Fi, PON, DOCSIS, or satellite. FIG. 8 shows one example of how the traffic from the AE are classified to queues in the DOCSIS CM. The CM may be a communication device that implements communication protocols including but not limited to 5G, LTE, Wi-Fi, PON, DOCSIS, or satellite. The QoS framework shown in FIG. 8 may provide a common QoS between the AE system and the transport system.

DOCSIS queues in the CM may be managed by DOCSIS service flows in the CMTS. The general approach is illustrated by the LTE example in FIG. 8 and several alternatives approaches are described.

Packets that arrive on the local network interfaces that do not match a specific classifier may be by default directed to the classis queue (Queue 0). The classic queue may be a best effort queue managed with the DOCSIS request-grant (REQ-GNT) upstream scheduling mechanism. If Low Latency DOCSIS (LLD) techniques are used, some Non-Queue Building (NQB) packets may get redirected to a common low latency queue (Queue 1) while Queue Building (QB) packets may remain in the classic queue.

The low latency queue may achieve its low latency by using a scheduling service such as Predictive Grant Services (PGS) that may send frequent grants. Alternatively, the low latency queue may use Real Time Polling Service (RTPS) that may send frequent requests.

The Voice over IP (VoIP) bearer path from the Embedded Multimedia Terminal Adaptor (eMTA) may be mapped to a constant bit rate queue (Queue 6) that may use the Unsolicited Grant Services (UGS) scheduling service. Alternatively, the VoIP bearer traffic may go to the common low latency queue if that queue has sufficient capacity and low jitter. The VoIP signaling path may be sent to a dedicated low latency queue that may use RTPS (Queue 7). Alternatively, the VoIP signaling may be sent to the common low latency queue.

The BWR message may contain forward-looking time-based information that may describe to the CMTS upstream scheduler what the future byte flow is going to be on each BWR flow. The AE, in this example, may perform a request-grant exchange per layer 2 LCG. This grant behavior may be combined with prediction and then mapped to BWR flows. The AE may be configured to map each LCG to a unique BWR Flow ID. In this example, LCG 0 to 3 may map to BWR Flow IDs 0 to 3. To ensure this works, the AE system may need to have a unique assignment of a DSCP to a LCG. Alternatively, the AE may be configured to map the four LCGs to two Flow IDs, one for signaling and one for data, or even one flow ID for all packets.

Each BWR flow ID may have a set of DSCP classifiers associated with it. To ensure the CMTS has the mapping between BWR flow IDs and DSCPs for a CM, the BWR flow ID and its associated DSCP classifier is described in the CM configuration file, which is sent to the CMTS during CM registration. The classifiers may be reconfigured any time. In addition, the DOCSIS system may discover the source IP address of the AE. These may allow each BWR flow to be classified to a queue in the CM. In FIG. 8, BWR flows 0 to 3 may be mapped to CM queues 2 to 5. This may allow QoS preferences across LCGs to be preserved when there is congestion at the CM queues. Alternatively, multiple BWR flows may be mapped to a single queue (Queue 2).

Alternatively, if BWR flow 0 is mapped to LCG flow 0, which may contain only signaling information, then BWR flow 0 may be classified to the common low latency queue, and the remaining three BWR flows may be mapped to one, two, or three queues.

Alternatively, the CM could choose to support multiple queues per service flow. In such a scenario, the CMTS may issue one flow of grants for the service flow for the sum of the traffic across all the queues in that service flow, or all the queues in the CM if the CM is configured with a single service flow. The CM may distribute the grants across the queues based upon a local QoS policy such as Class Based Weighted Fair Queueing (CB-WFQ).

While the majority of signaling may come from the UE that is attached to the AE, the AE may generate its own signaling messages. These signaling messages may be classified to the common low latency queue. Alternatively, the AE may set up a BWR flow for AE signaling and use the BWR message to create scheduled future grants for the signaling messages. So, if the AE can predict its own signaling patterns, it may also create a BWR channel for those messages.

The BWR message itself may be a signaling message that may be generated by the AE. The BWR message may be a time-critical message and may be classified to the common low latency queue. Alternatively, it may be mapped to a dedicated queue (not shown) because its behavior may be fairly predictable and it may be scheduled separately. Alternatively, the BWR may be classified into a BWR queue (Queue 2) and the BWR message may be used to schedule future bandwidth for the BWR message itself. This may allow the entire BWR data and signaling system to operate separately from the common low latency queue.

There may be more than one AE behind a CM. In this case, because all traffic may be described by its DSCP and IP SA, 802.1Q header, or any other QoS identifiers as previously mentioned, the traffic from each of the AEs may be combined onto a common set of queues in the CM. The DOCSIS system may need to combine the values BWR Flow ID in the BWR messages from each AE.

The specific set of CM classifiers chosen may be a trade-off between DOCSIS performance and efficiency. The example in FIG. 8 shows seven queues. This may be as many as ten queues or as low as three queues for example although the exact number may be implementation dependent. Those three queues, for example, may comprise: i) classic queue for QB traffic not managed by the BWR; ii) a Low Latency queue for NQB traffic not managed by the BWR; and iii) a queue for QB and NQB traffic managed by the BWR. The BWR may provide a method based on scheduler pipelining and prediction that achieves low latency for all traffic from the AE, including queue-building and non-queue-building traffic.

Figure 9:
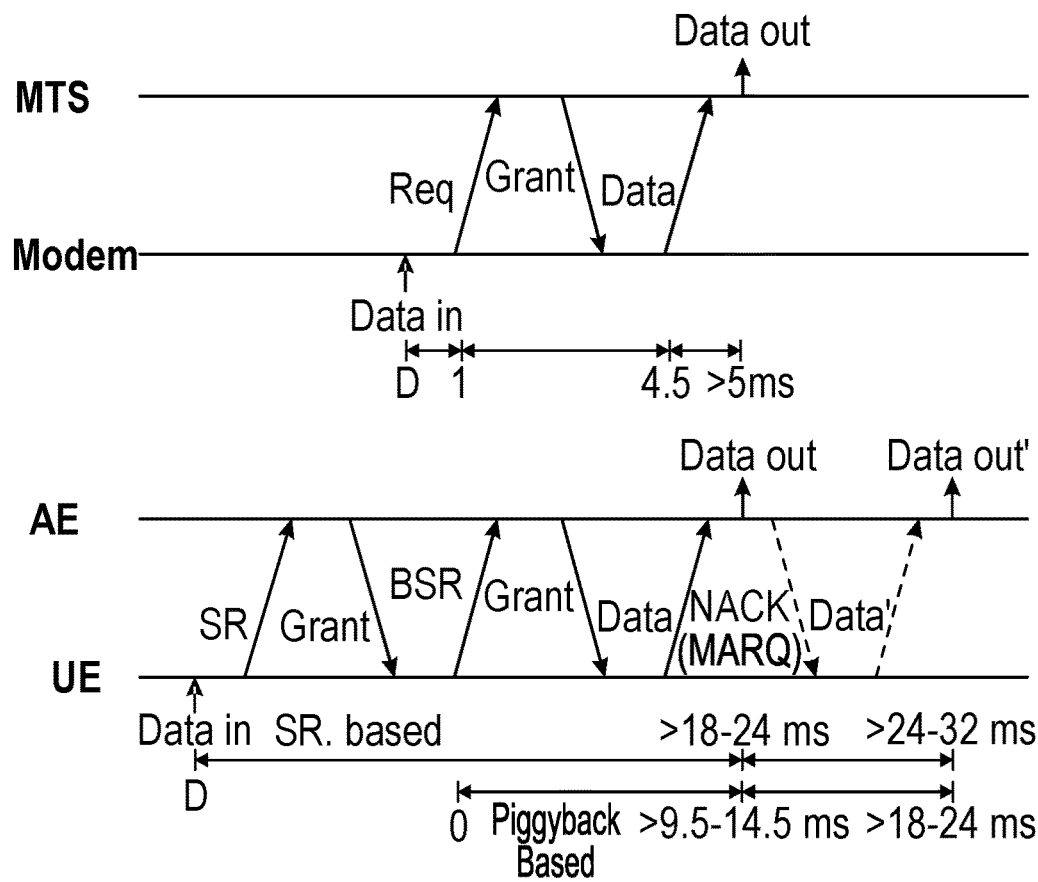
FIG. 9 illustrates a comparison between Data Over Cable Service Interface Specification (DOCSIS®) system and an LTE system, in one exemplary embodiment.

FIG. 9 illustrates a comparison between DOCSIS and LTE. Both LTE and DOCSIS may manage a point to multipoint network. Both LTE and DOCSIS may use a scheduled upstream and both may be managing subscriber traffic. The main difference between LTE protocol and DOCSIS protocol may be that LTE manages what is substantially a wireless network while DOCSIS manages what is substantially a wired network and the protocols may be different since they were designed by different committees for different network architectures. The wireless channel and mobility aspect of LTE add challenges that may not need to be dealt with in DOCSIS. Once connected, scheduling and data transfers between the UE and the AE and between the modem and the MTS follow similar principles.

Another difference between LTE and DOCSIS may be that LTE supports frequency division duplex (FDD) and time division duplex (TDD). FDD is similar to TDD in that Uplink (UL) and Downlink (DL) may be segregated by frequency bands. In TDD, the same band may be used for UL and DL and the interleaving of the UL and DL transmissions in the same spectrum may add access delay for UL and DL transmissions. Consequently, TDD Round Trip Time (RTT) may be much higher than FDD.

As shown in FIG. 9, DOCSIS upstream communication may use a request-grant (i.e., REQ-GNT) approach. A request message may be sent from the modem to the MTS. The MTS may prepare a DOCSIS MAC management message (MMM), called the MAP, and inserts an entry indicating a grant for the modem. The grant entry in the MAP message may contain an upstream Service Identifier (SID) associated with a service flow assigned to the modem, a transmission time signaled as a mini-slot number, and the number of bytes to be transmitted. The MTS may then transmit the MAP to the modem, so that the modem may make use of the grant to send its upstream data to the MTS.

There may be many factors that may determine the request-grant time in DOCSIS. The DOCSIS specification contains a detailed analysis of the request-grant delay. The minimum delay may be every second MAP time plus some circuit and queuing delay. The DOCSIS 3.0 CMTSs, for example, may use a 2 ms MAP time. Some DOCSIS 3.1 CMTSs may use a 1 ms or less MAP time.

The MTS scheduling process may have a significant impact on request-grant delay. For example, if the MTS is using a Best Effort (BE) scheduling algorithm, requests may be made in contention slots where the requests may fail on the first try if multiple modems are trying to use the same contention slot. If the MTS is using the real-time Polling Service (RTPS) scheduling process, the request may be placed in a dedicated slot that may ensure that the requests are successful. BE may perform better than RTPS when DOCSIS is idle because many request contention slots may be available. In that case, BE scheduling algorithm may provide lower latency than RTPS for the modems. However, in a busy system where there are fewer contention request slots and modems may need to re-request often, RTPS may provide guaranteed latency. Requests may also be sent as a piggyback field as part of a data packet sent by the modem. Piggybacking may be deterministic within a flow and may avoid contention.

Detailed request-grant latency calculations may be shown in Table 1. At the heart of the LTE uplink scheduler is a similar request-grant mechanism. The request may be sent from the UE to an AE. The UE may comprise a cellular phone while the AE may comprise a macrocell or a small cell (e.g., microcell, picocell, femtocell, nanocell). When data is generated at the UE, the UE may first determine if it already has an LTE UL grant. If it does not, the UE may wait for an opportunity to transmit a Scheduling Request (SR), where SR opportunities may come along once every 1 to 10 ms depending on the configured periodicity of the SR. The purpose of the SR may be to keep the upstream signaling overhead low, which may be critical in wireless where spectrum is costly.

Upon receiving the SR, the AE may schedule an UL grant so that the UE may transmit a Buffer Status Report (BSR) to the AE. Once the AE receives the BSR from the UE, it may become aware of the outstanding UL data present in the UE's upstream queues. The AE may then schedule UL grants and transmit the grants to the UE via a downlink control information format 0 (DCI-0) message transmit in the physical downlink control channel (PDCCH). LTE may operate every subframe, which may be 1 ms. However, due to processing constraints, the AE's BSR-grant delay may be 4 ms for both the AE and the UE. In other words, upon receiving the BSR, the AE may perform scheduling and may send DCI-0 to arrive at the UE in 4 subframes, and the UE is scheduled to transmit 4 subframes later. Assuming a very small SR opportunity periodicity (e.g., 1 ms), the minimum delay before a UE may transmit UL data may be 18 ms, which may be slightly longer than the minimum DOCSIS request-grant latency.

TABLE 1

| Latency Components | Latency (ms) SR | Latency (ms) Piggyback |
|---|---|---|
| Waiting time for SR (assume configured SR period of 5 ms) | 0.5-5.5 | n/a |
| UE sends SR, AE decodes SR, AE generates grant for BSR | 4 | n/a |
| AE sends grant, UE processes grant, UE generates BSR | 4 | 0-4 |
| AE processes BSR, AE generates grant for data | 4 | 4 |
| AE sends grant, UE processes grant, UE sends UL data | 4 | 4 |
| AE decodes UL data (estimate) | 1.5-2.5 | 1.5-2.5 |
| Total | 18-24 | 9.5-14.5 |

The LTE transmissions over the LTE air interface often occur in a harsh wireless environment (e.g., cell edge). Wireless signals may be easily degraded due to path loss and interference and transmission errors may be more likely than in DOCSIS. To overcome the transmission errors, LTE may have two retransmission mechanisms: i) Hybrid Automatic Repeat reQuest (HARQ), which operates at the MAC layer; and ii) Automatic Repeat reQuest (ARQ) which operates at the radio link control (RLC) layer. Other protocols may have more or fewer.

HARQ is intended to quickly re-transmit the LTE transport blocks to recover from most errors in conjunction with a good Forward Error Correcting (FEC) process. RLC ARQ is a higher layer re-transmission mechanism that has higher overhead, but improves the reliability of the link after HARQ.

The use of RLC ARQ may be optional in LTE and may depend on the type of traffic and QoS parameters (e.g., error rate, latency, bit rate, etc.) desired. For example, for voice over LTE (VoLTE), packet loss may not be that critical, but latency may be. The human ear can tolerate small amounts of packet loss, but long delays may become annoying during a phone conversation. Therefore, for voice traffic, ARQ retransmissions may not be required and an LTE EPS bearer for voice may be configured to use the RLC Unacknowledged Mode (UM) entity, which may not use ARQ. On the other hand, Transmission Control Protocol (TCP) traffic packet loss triggers slow start, and throughput can suffer. However, longer delays can be tolerated by TCP traffic therefore ARQ may be used by configuring the LTE EPS bearer to use the RLC Acknowledged Mode (AM) entity.

The purpose of an additional PHY layer retransmission mechanism may be to reduce latency. After transmitting a coded block of bits, which is termed a Resource Block (RB), the transmitter, the UE, or the AE, may keep the RB in the transmission buffer. The receiver PHY layer may decode the RB and pass the CRC results to the MAC layer. The MAC layer may then issue either a HARQ Acknowledgement (ACK) or Negative Acknowledgement (NACK) based on the results. Between the time the RB may be received at the receiver and the time a HARQ feedback may be received at the original transmitter of the RB, there may be 4 ms of delay.

In summary, if lightly loaded systems and FDD duplexing for LTE are considered, DOCSIS may have a minimum request grant-grant delay of about 5 ms while 4G LTE may have a minimum request-grant delay of 18 to 24 ms without re-transmission and 26 to 34 ms with one HARQ retransmission. These latency values may increase under higher loads or if TDD is used in LTE.

Figure 10:
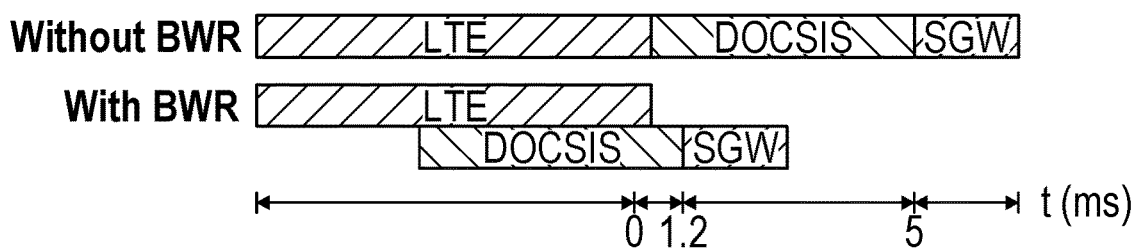
FIG. 10 illustrates reducing transport network effective latency under that of an associated wireless network.

FIG. 10 illustrates reducing DOCSIS effective latency under LTE. LTE request-grant time is longer than DOCSIS, yet mobile operators may require backhaul delays to be on the order of a few milliseconds. Embodiments of the disclosure may use the longer LTE latency to start DOCSIS processes in parallel and reduce the overall LTE-DOCSIS system latency by using a Bandwidth Report (BWR) message.

Figure 11:
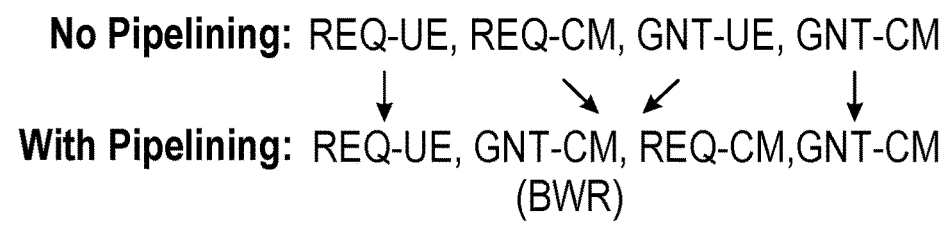
FIG. 11 illustrates pipelining requests and grants.

FIG. 11 illustrates pipelining requests and grants. Conventional LTE-DOCSIS systems, which do not have BWR messaging, have cumulative latency as shown in the upper diagram of FIG. 10. When BWR messaging is introduced into the LTE-DOCSIS system, the DOCSIS request-grant loop may be started earlier and in parallel with the LTE request-grant loop, leading to much lower latency, as shown in the lower diagram of FIG. 10. This may be accomplished by treating the LTE and DOCSIS systems as one pipelined system rather than as two independent systems. For this pipeline process to work, the DOCSIS system may receive some information from the LTE system in the form of the BWR message.

BWR messaging may allow an external system, such as an LTE eNB, to request bandwidth from a DOCSIS system for some specific time in the future, before the arrival of the actual traffic. The eNB may provide a future traffic profile through the BWR message that may allow the CMTS to make QoS and granting decisions earlier than it normally would.

The BWR message may replace the CM's internal layer 2 request message that is native to DOCSIS for LTE uplink data arriving at the CM. The BWR message itself may comprise an external message that may be transmitted from the eNB to the CMTS, through the CM. The BWR message may be for example a layer 3 IP message. The content of the BWR may be populated with information describing future data that will arrive at the CM.

The BWR message may be created by the eNB's LTE UL scheduler just after the scheduler finishes determining the granting decision for one or more UE(s) based on the UE's outstanding UL data buffer sizes. The BWR message created after scheduling decision may contain a description of the amount of UL data that is expected to arrive at the eNB and be forwarded to the CM. The BWR message may then be transmitted from the eNB to the CMTS, via the CM, in an upstream service flow that may be dedicated or shared with other traffic, as described above in FIG. 8, earlier than the CM would normally issue its request.

Even though the eNB's UL scheduler may generate the BWR message, an entity that is external to the eNB scheduler may generate the BWR message, based on the eNB scheduler's decision. In this case, the AE scheduler may simply store the scheduling decision in an internal memory, and the external entity may retrieve the information before generating the message.

The BWR message may be generated at regular time interval, such as one per LTE subframe, or one per 5G slot. Alternatively, the BWR message may be generated when the AE schedules the first sub-system. Alternatively, the BWR message may be generated asynchronously from the scheduling decision interval.

A result of using the BWR message may be that the DOCSIS system is made aware of the LTE scheduler's scheduling decisions using the BWR message. Rather than having two separate and sequential latency-additive LTE and DOCSIS request-grant loops, the BWR process may start DOCSIS's request-grant loop early and in parallel to LTE's uplink granting. The CMTS scheduler may grant the CM just-in-time or around the time for the UE's upstream data to arrive at the CM, which may reduce the upstream latency on the transport network, which may result in overall reduced upstream latency for the end-to-end communication system.

Figure 12A:
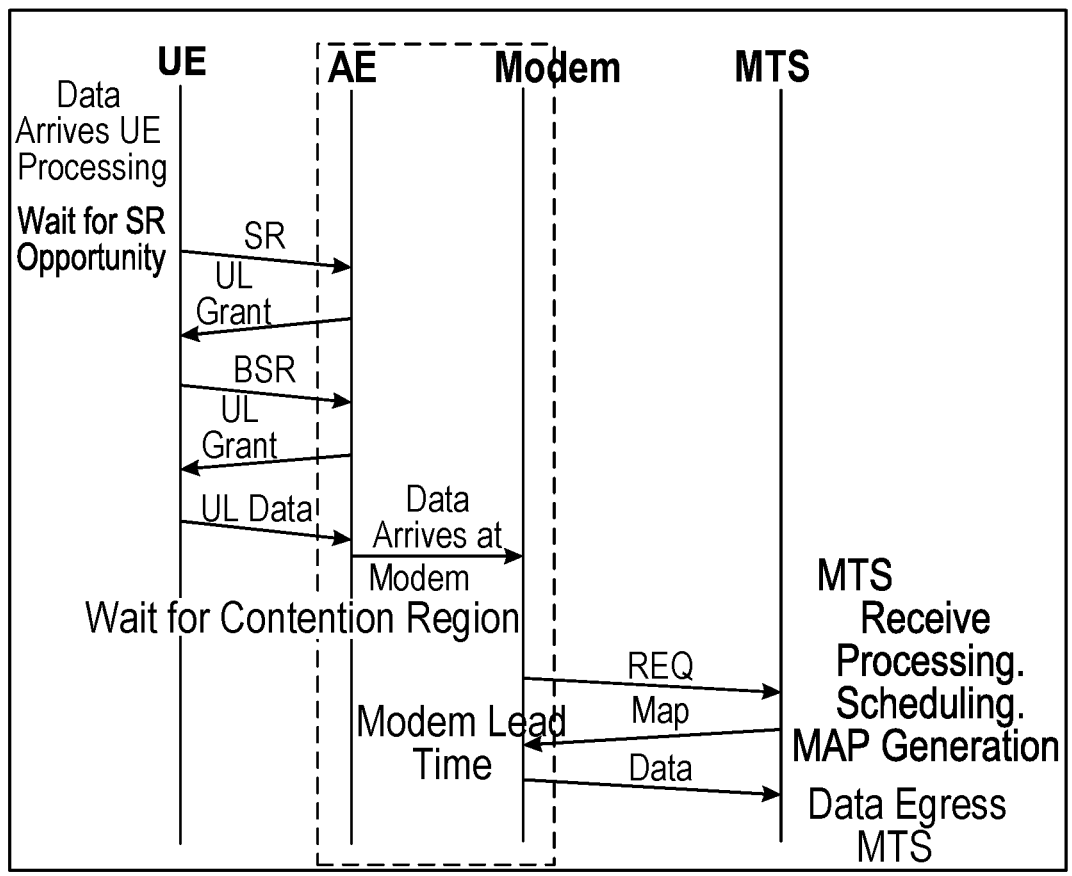
FIG. 12A illustrates a conventional system where the two systems work in serially without an pipelining.
Figure 12B:
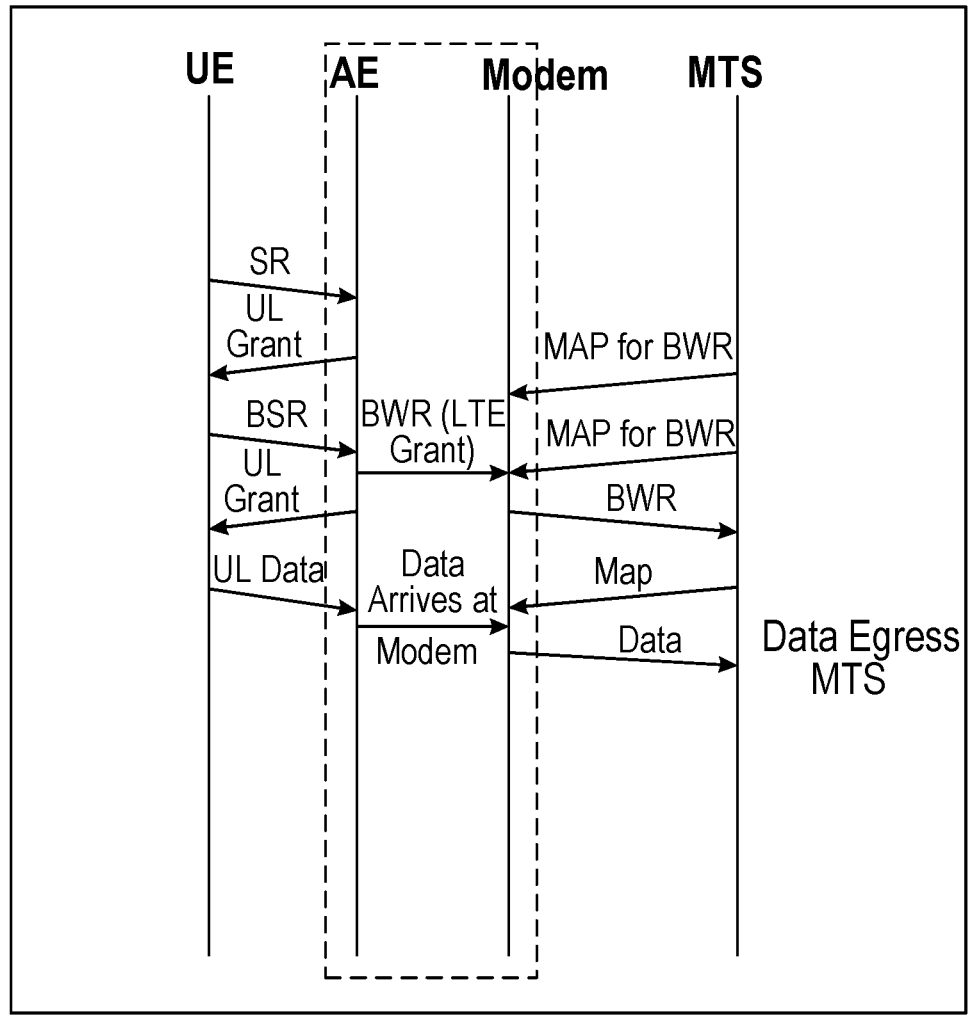
FIG. 12B illustrates a transmission pipeline.

FIG. 12A shows a conventional system where the two systems work in serially without an pipelining. FIG. 12B illustrates a transmission pipeline. The timing shown is approximate and for illustration purposes. After the AE received the BSR and generated an LTE UL grant, the AE scheduler may generate a BWR message indicating the amount of grant and the grant time. The BWR message may then be forwarded to the modem. The AE and the modem may be connected via a Gigabit Ethernet connection and the propagation time of the message may be negligible.

While the above example of LTE and DOCSIS is used, the BWR message may apply for PON. For example, in PON, the Modem, which is ONU, sends a REPORT message to the MTS, which is OLT, to indicate a request, and the OLT sends a GATE message to the ONU to indicate a grant.

Figure 13:
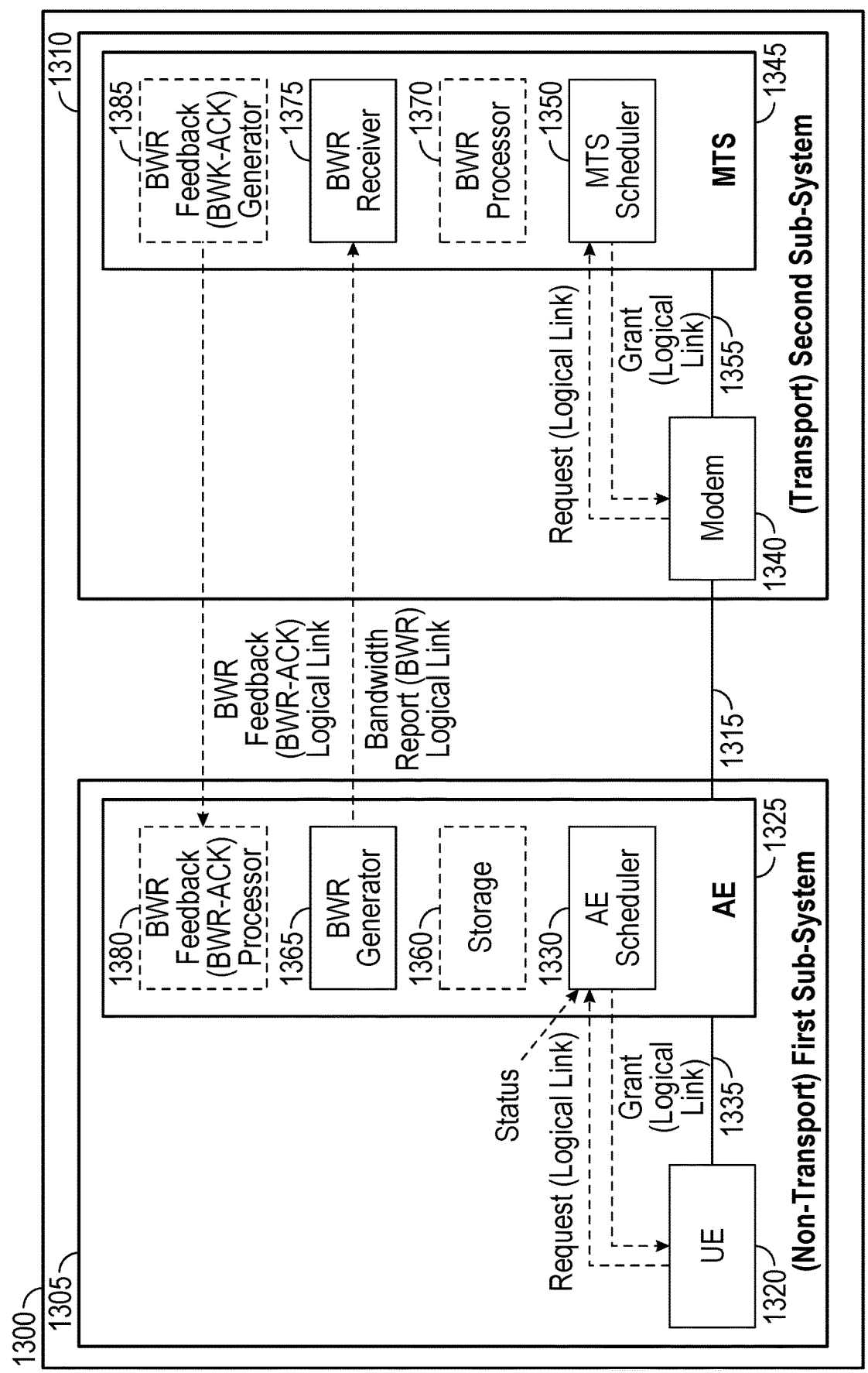
FIG. 13 is a block diagram of a pipelined system for backhaul.

FIG. 13 shows a pipelined system 1300 for backhaul. As shown in FIG. 13, pipelined system 1300 may comprise a first sub-system 1305 and a second sub-system 1310. First non-transport sub-system 1305 may comprise User Equipment (UE) 1320 and an AE 1325. AE 1325 may comprise an AE scheduler 1330, an optional storage 1360, a BWR generator 1365, and an optional BWR feedback (BWR-ACK) processor 1380. BWR generator 1365 and BWR-ACK processor 1380 may reside inside AE scheduler 1330, but may be separately resided in AE 1325. UE 1320 may be connected to AE 1325 via a first system interface 1335. Second transport sub-system 1310 may comprise a modem 1340, a Modem Termination System (MTS) 1345. MTS 1345 may comprise an MTS scheduler 1350, a BWR processor 1370, a BWR receiver 1375, a BWR processor 1370, and an optional BWR feedback (BWR-ACK) generator 1385. BWR processor 1370 may be an application programming interface (API) that converts BWR message to a format that the MTS scheduler 1350 can understand. BWR processor 1370 may reside inside MTS scheduler 1350, or may be separately resided in MTS 1345. Modem 1340 may be connected to MTS 1345 via a second system interface 1355. AE 1325 is connected to modem 1340 by a pipeline system interface 1315.

Note that the MTS 1345 may further be split into a remote unit MTS-RU such as for example an remote PHY device (RPD) and a central unit MTS-CU. In this case, PHY layer may reside in MTS-RU, MTS scheduler 1350, BWR processor 1370, BWR receiver 1375, BWR feedback (BWR-ACK) generator 1385 may reside in MTS-CU.

First sub-system 1305 may comprise, but is not limited to, a small cell sub-system, a macrocell sub-system. First sub-system 1305 may use applications comprising, but not limited to, Long-Term Evolution (LTE) broadband cellular network applications, Fourth Generation (4G) broadband cellular network applications, Fifth Generation (5G) broadband cellular network applications, Wi-Fi, DOCSIS, PON (EPON, GPON, SIEPON), satellite, microwave, RF for example. Second sub-system 1310 may comprise, but is not limited to, a Hybrid Fiber Coax (HFC) system that uses DOCSIS, a network that uses PON such as Ethernet Passive Optical Network (EPON), GPON, SIEPON, Wi-Fi, LTE, 4G, 5G, 6G, Integrated Access Backhaul (IAB), and microwave networks, for example. Pipeline system interface 1315 may be an interface, may comprise, but is not limited to, a Wi-Fi interface, 4G interface, 5G interface, an RF interface, an Ethernet network interface (e.g., a Gigabit Ethernet connection), or may be connected via a bus, such as an onboard bus.

UE 1320 may comprise, but is not limited to, a tablet device, a mobile device, a smart phone, a telephone, a remote control device, a set-top box, a digital video recorder, a modem such as a cable modem or a PON modem, a personal computer, a network computer, a smart TV-like device, a network storage device, a network relay devices, a cell or access point (e.g., macrocell, microcell, femtocell, nanocell, and Wi-Fi Access Point in a multi-hop communication network) or other similar microcomputer-based device capable of using first sub-system 1305. AE 1325 may comprise a device that is connected to a mobile telephone network that may communicate directly and wirelessly with mobile handsets (e.g., UE 1320). AE 1325 may comprise, but is not limited to, an eNB, a gNB, an 802.11ax Wi-Fi Access Point (AP), a cable MTS, a EPON termination system (OLT or equivalent), a GPON termination system, a SIEPON termination system, satellite modem termination system (SMTS or equivalent), a RF node, or an IAB node for example. First system interface 1335 may comprise but not limited to a Hybrid Fiber-Coaxial (HFC) network, a PON network, a satellite network, a Wi-Fi network, a 4G network, a 5G network, a RF node, or an IAB network. AE scheduler 1330 may provide and manage a request-grant loop for traffic from UE 1320 to AE 1325 on first sub-system 1305. A predictor (not shown) may be reside on AE scheduler 1330 or BWR generator 1365.

Modem 1340 may comprise, but is not limited to, a Cable Modem (CM), a PON modem (ONU or equivalent), a satellite modem (SM or equivalent), or a Wi-Fi node. MTS 1345 may comprise, but is not limited to, a Cable Modem Termination System (CMTS), a EPON termination system (OLT or equivalent), a GPON termination system, a SIEPON termination system, satellite modem termination system (SMTS or equivalent), or an IAB node. Second system interface 1355 may comprise but not limited to a Hybrid Fiber-Coaxial (HFC) network, a PON network, a satellite network, a Wi-Fi network, a 4G network, a 5G network, or an IAB network. MTS scheduler 1350 may comprise a CMTS scheduler, a PON scheduler (EPON, GPON, SIEPON), a Wi-Fi scheduler, a satellite scheduler, a 4G scheduler, a 5G scheduler, a 6G scheduler, or an IAB scheduler, and may provide and manage a request-grant loop for traffic from modem 1340 to MTS 1345 on second sub-system 1310. A pre-processor (not shown) may be reside on MTS scheduler 1375 or BWR processor 1370.

Elements of pipelined system 1300 (e.g., UE 1320, AE 1325, AE scheduler 1330, modem 1340, MTS 1345, MTS scheduler 1350, BWR generator 1365, BWR receiver 1375, and BWR processor 1370) may be practiced in hardware and/or in software (including firmware, resident software, micro-code, etc.) or in any other circuits or systems. The elements of pipelined system 1300 (e.g., UE 1320, node 1325, node scheduler 1330, modem 1340, MTS 1345, MTS scheduler 1350, BWR generator 1365, BWR receiver 1375, and BWR processor 1370) may be practiced in electrical circuits comprising discrete electronic elements, packaged or integrated electronic chips containing logic gates, a circuit utilizing a microprocessor, or on a single chip containing electronic elements or microprocessors. Furthermore, the elements of pipelined system 1300 (e.g., UE 1320, node 1325, node scheduler 1330, modem 1340, MTS 1345, MTS scheduler 1350, BWR generator 1365, BWR receiver 1375, and BWR processor 1370) may also be practiced using other technologies capable of performing logical operations such as, for example, AND, OR, and NOT, including but not limited to, mechanical, optical, fluidic, and quantum technologies. As described in greater detail below with respect to FIG. 24, the elements of pipelined system 1300 (e.g., UE 1320, node 1325, node scheduler 1330, modem 1340, MTS 1345, MTS scheduler 1350, BWR generator 1365, BWR receiver 1375, and BWR processor 1370) may be practiced in a computing device 2400.

During operation, UE 1320 may make a request for bandwidth to AE 1325, which is received by AE scheduler 3330. When AE scheduler 3330 makes a grant decision, which could be before, during, or after, a grant is sent to the UE, a BWR message may be sent from AE 1325, e.g., by AE scheduler 1330 or BWR generator 1365, to MTS scheduler 1350 (or optionally via BWR receiver 1375). Although FIG. 12 depicts the logical link on which the BWR message is sent, the BWR message is physically sent on interface 1315. Without the present systems and methods, modem 1340 would need to wait for the first sub-system traffic to arrive at modem 1340, and then makes a bandwidth request to MTS scheduler 1350. The MTS scheduler 1350 would then schedule a second sub-system (SSS) grant to transport the first sub-system traffic across the second sub-system. However, utilizing the present systems and methods, the second sub-system request-grant process may be eliminated or shortened, which results in significantly reduced latency on second sub-system 1310 and end-to-end system 1300. Using the BWR message, the AE scheduler 1330 may indicate the traffic to be sent from UE 1320 to AE 1325, which will then pass to the second sub-system 1310. Although one UE 1320 is shown, BWR message may indicate the traffic to be sent from a plurality of UEs. Based on the BWR message, the second sub-system 1310 schedule one or more second sub-system (SSS) grants for transmitting traffic associated with the BWR message from the first sub-system 1305 on the second sub-system 1310 across link/interface 1355. The second sub-system 1310 may transmit the traffic based on the scheduled SSS grants. In other words, the BWR message describes the traffic to be sent across the second sub-system 1310, e.g., link/interface 1355, before the traffic actually arrives at the second sub-system 1310, e.g., at modem 1340. The second sub-system 1310 may then utilize the BWR messages to ensure SSS grants are in place around the time the traffic has arrived at the modem 1340 from the first sub-system 1305. Described another way, the BWR message is a mechanism of the first sub-system 1305 for indicating to the second sub-system 1310 of what will come in the future. Described yet another way, embodiments of the disclosure may start the request-grant loop in second sub-system 1310 early and in parallel, before the request-grant loop in the first sub-system 1305's grant process is completed. In this way, the overall latency for pipelined system 1300 may be reduced.

In an predictive embodiment, to adapt the BWR message to the traffic flow, a predictor may reside in the AE, for example in AE scheduler 1330 or BWR generator 1365. The predictor may look at the status of the interface 1335 to determine if the BWR message should be issued. A pre-processor may reside in MTS scheduler 1350 or BWR processor 1370, to process the advanced BWR message, for example one or more BSRs. In one embodiment, an optimal period for BWR for LTE FDD may be 1 ms because the eNB scheduler may make scheduling decision once every LTE subframe (i.e., every 1 ms). An MTS (e.g., MTS 1345) may use the information given in the BWR messages, along with other scheduling constraints, and may generate grants for a modem (e.g., modem 1340).

As an example of pipelining operation, if a 1000-byte data transfer from UE 1320 will occur in 8 ms and there is an anticipated 1 ms delay in a software stack of an AE (e.g., AE 1325) for transport block decoding and packet reassembly before transmission to the modem, a BWR message may be transmitted to MTS 1350 to request 1000-bytes in 9 ms. The BWR message may be received at modem 1340 and may be classified to a service flow. When a grant arrives for that service flow, the BWR message may be transported to MTS 1345 and delivered to an MTS scheduler (e.g., MTS scheduler 1350) that may perform a scheduling process to read the BWR information and decide when in the future that one or more grant from MTS 1345 should be sent to the modem on a particular service flow. MTS 1345 may be configured to add an additional, for example, 2 ms to one or more grants generated based on the BWR message to ensure any delayed traffic leaving AE 1325 is accommodated. Therefore, MTS 1345 may issue a grant, for example, 11 ms after the BWR is created. In other embodiments, modem 1340 may receive and process the BWR message and generate appropriate requests based on the BWR message content.

Embodiments of the disclosure may also utilize synchronization and timing. For example, if an LTE system (e.g., first sub-system 1305) is scheduling in the future and a DOCSIS system (e.g., second sub-system 1310) is granting in the future, both systems may be synchronized in time for the grants to line up. One process may be to independently synchronize the DOCSIS system to GNSS and the LTE system to GNSS. Another process may be to synchronize the DOCSIS system to GNSS and use the DOCSIS SYNC framework to allow the CM to generate a 1588 interface that would then be used to synchronize LTE system.

Table 2 is an example of system level timing for a BWR message to transit from the AE (e.g., first sub-system 1305) to the MTS (e.g., second sub-system 1310). Note that since the AE scheduler has to make a scheduling decision prior to loading the grants on the interface 1335, it is possible that the AE could release a BWR message prior to releasing the grants on interface 1335 to the UE 1320. This may give extra time to the BWR transit delay budget. For example, the frame time in LTE may be 8 ms, so data packets arriving at the CM may arrive 10 ms after a BWR message is generated. Table 2 shows that there may be enough time for the BWR message to get to the CMTS scheduler.

TABLE 2

| Action | Time Variance |
| --- | --- |
| Grant decision at AE | 0 |
| BWR sent from AE to CM | 0-0.5 ms |
| CMTS GNT arrives at CM | 0-2 ms |
| CIN Delay | 0-0.5 ms |
| BWR Queuing time for Scheduler | 0-1 ms |
| CMTS MAP processing time | 0.4 ms |
| CIN Delay | 0-0.5 ms |
| CM MAP processing time | 0.6 ms |
| PHY delays and system margin | 0.5 ms |
| Total Range | 1.5 to 6.5 ms |

However, if the queuing delay in modem 1340 is greater than 1 to 2 ms, if there are other delays in the system, or if the AE latency is not 10 ms, but 1 to 2 ms as may be the design target for 5G, the BWR might arrive too late to the CMTS. If the BWR message arrives in time, the scheduler may be reactive. It may react to the incoming request by scheduling the grants (i.e., reactive grants) when needed. If the BWR is late, the US scheduler may be predictive. In a predictive mode, the scheduler may be releasing a stream of grants to modem 1340 and then using BWR as part of a feedback loop to correct any differences between predictive and actual (i.e., predictive grants). From that viewpoint, getting feedback a few milliseconds after granting may be a tight closed loop feedback system.

Thus, BWR when coupled with a predictive scheduler, may handle low latency systems such as 5G that have short internal frame times and shorter times between their internal request and grants. This approach may even help reduce the CPU loading on AE 1325 by allowing BWR messages to be sent less often. For example, if a BWR message is sent every 1 ms, that is 1000 BWR messages per second. If a BWR message were sent once every 5 ms, that may be only 200 BWR messages per second. Even longer BWR intervals may be used with stronger prediction in the US scheduler.

Figure 14:
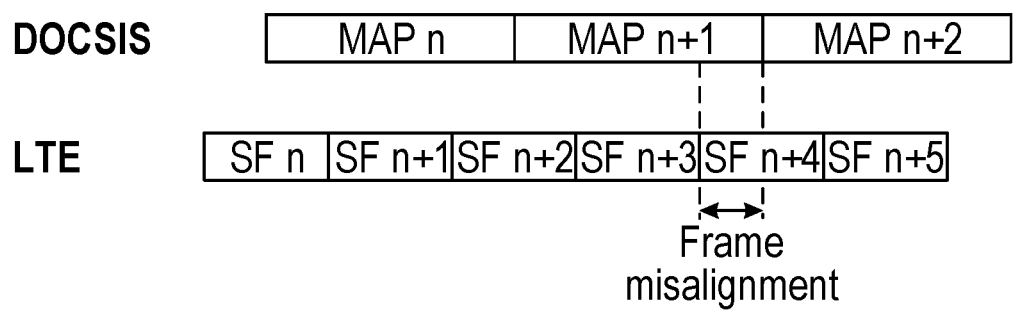
FIG. 14 illustrates wireless network and transport network frame misalignment despite system time synchronization.

FIG. 14 illustrates LTE and DOCSIS frame misalignment despite system time synchronization. LTE and DOCSIS use different framing mechanisms for their transmissions. For example, the LTE air interface transmissions may be based on frames and subframes. A subframe may be 1 ms in duration and a frame may be 10 ms in duration. Meanwhile, DOCSIS may use a MAP interval of approximately 2 ms and grants may be issued on a mini-slot level of granularity. The two framing systems may not be aligned in time. In other words, the eNB scheduler and the CMTS scheduler may comprise two asynchronous systems that may be trying to communicate scheduling information.

It may be difficult to schedule grants at exact times in a DOCSIS MAP interval because doing so may excessively fragment other flows. Thus, DOCSIS may be configured to allow the CMTS's upstream scheduler some flexibility during scheduling, which results in some grant jitter. This may mean that the selected mini-slot may not align perfectly with the upstream egress data from the eNB. The CMTS may need to account for all the grant and upstream data egress jitter by adding some engineering margin, otherwise the grant may miss some packets and latency may increase.

If the data from the UE is not received correctly at the eNB, the eNB may transmit a Negative Acknowledgement (NACK) to the UE, which may trigger data retransmission. This may mean that the grant requested in the BWR message may not get used for the intended data transfer on the DOCSIS upstream link. The grant may be used by other data, if other data has been delayed, but the grant may also not be used and therefore some DOCSIS bandwidth may be wasted.

Since the LTE scheduler may know when a transport block failed to be decoded successfully, the LTE BWR predictor may know when re-transmissions are going to occur. If the LTE transport block is successfully received when it is re-transmitted to the eNB, some packets may egress from the eNB. The predictor may then account for the delayed and re-transmit data by adding the byte to a BWR corresponding to the subframe that includes the re-retransmission.

Figure 15:
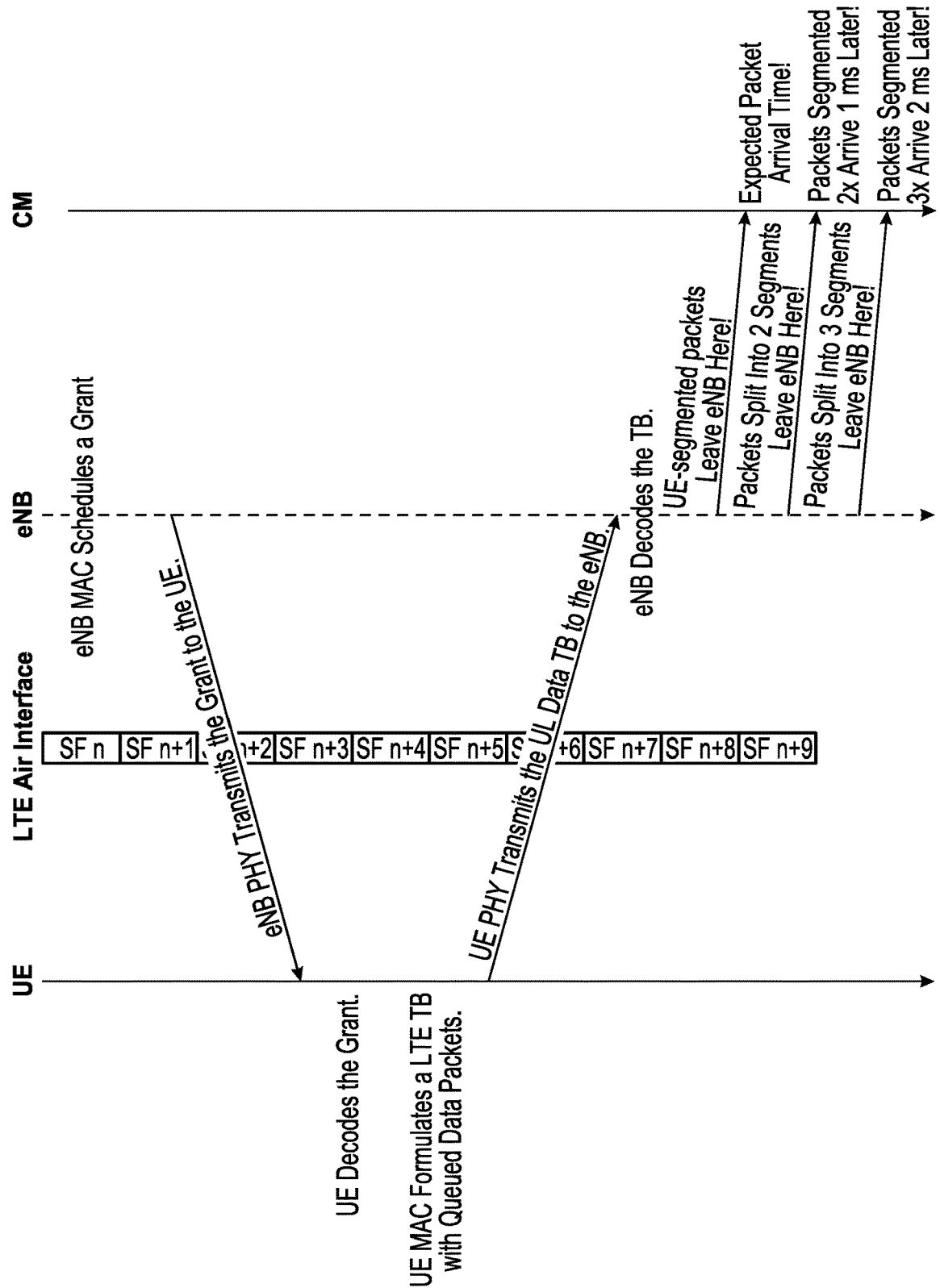
FIG. 15 illustrates packet delay due to packet segmentation on the wireless air Interface.

FIG. 15 illustrates packet delay due to packet segmentation on the LTE air Interface. The packets that are transmitted from the UE to the eNB may be segmented (if required) and placed into LTE transport blocks. If a packet fits entirely within an LTE transport block, the UE may transmit it entirely in one subframe. When the eNB correctly receives a complete packet, the packet may be passed immediately up the eNB's software stack and out the eNB's Ethernet interface.

In the case where not all the segments of a packet have been received, the segments may be stored in a buffer at the RLC layer until all the segments are received. Once all the segments are received, the RLC entity may re-assemble the segments into a complete packet and the packet may be transmitted out the eNB's Ethernet interface.

As an example of the effect of segmentation and re-assembly, it may be assume that a packet is segmented into two pieces across two LTE transport blocks and both are received successfully (no decoding failures). The first transport block may be transmitted from the UE to the eNB, but it may only contain the first segment of the packet. Since the packet is incomplete, the RLC entity handling the EPS bearer may store the segment and wait for the next transmission. 1 ms later in the next subframe, the second transport block may be received at the eNB physical layer and after decoding, the RLC entity receives the second segment of the packet. The RLC may reassemble the complete packet and the packet may be sent out the eNB's Ethernet interface.

In this example, the result of the packet fragmentation that occurred on the LTE air interface added an additional 1 ms delay to the time when the packet was expected to leave the eNB. While this may not seem like much, consider that for each additional segment an additional 1 ms delay (e.g., Nfrag—1 milliseconds) may be added to the packet egress time and a packet that is late even by a small delay may miss a DOCSIS grant. This is illustrated in FIG. 15.

This packet fragmentation may be one of the causes of mismatches between the bandwidth requested by the BWR message and the actual data leaving the eNB's upstream Ethernet interface. Predicting the packet fragmentation and reassembly delay may be difficult. The LTE predictor may be predicting the future while the reassembly engine works in the present. If the LTE predictor has packet level visibility when scheduling, then it may address this problem. If it does not, then some engineering margin can be added by the predictor to the BWR message time index field to capture segmented packets.

It may appear that the solution is for the BWR predictor to increase the engineering margin in the BWR message. However, there may be a tradeoff between increasing the engineering margin to capture more upstream packets and upstream latency gain. The engineering margin that maximizes the upstream latency gain of the BWR feature may not necessarily correspond with the engineering margin that captures 100% of the delayed packets. So careful BWR predictor and engineering margin selection may be needed.

All physical devices have speed and bandwidth limitations and queues to help buffer data when the load on the interface is high. In a QoS based system, there may be multiple queues serving traffic with different priorities. The queue depth may depend on the traffic and the time it takes for a packet to arrive at its destination may depend on the time the packet waits in the queue and transmission on the Ethernet interface.

The LTE predictor may allow for the queueing and transmission time. If the predictor knows which QoS level each packet flow is, it may allocate shorter times for the high QoS traffic and longer times for lower QoS traffic to compensate for the time the packet may spend in a queue. The Ethernet packet transmission time may also add delay. However, the transmission delay may be small compared to other delays. For example, a 1518-byte Ethernet packet on a gigabit interface may take about 12 microseconds.

LTE signaling may be categorized into the following three categories. This may apply to all signaling packets that leave the Ethernet interface of the eNB, whether they are intended for another eNB or intended for the EPC. These three categories may comprise: i) fully scheduled signaling (UE signaling traffic transmit to the network that is accounted for by the eNB scheduler); ii) partly scheduled signaling (eNB signaling transactions that have one or more transactions to the UE followed by one or more transactions to the Ethernet interface. This signaling may be only partially accounted for by the eNB scheduler); and iii) unscheduled signaling (signaling traffic originating at the eNB, which may not be accounted for by the eNB scheduler). The predictor may account for each of these three cases.

Many signaling messages may be time critical and may be transmitted immediately. Some signaling messages may be periodic and quite predictable. Periodic signaling messages may be interesting because the grants described by the BWR may be described like LTE describes Semi-Persistent Scheduling (SPS) grants. For example, instead of transmitting 100 60-byte grants for voice packets arriving in the UE's transmit queue every 20 ms, the LTE may issue a single SPS grant to the UE for 100×60-byte grants spaced out by 20 ms. As long as the signaling traffic is predictable and timely, a SPS version of the BWR may be used by the eNB to ask the CMTS for periodic grants of a given size. The benefit of the SPS-BWR may be a reduction in BWR messaging overhead.

The predictor process that creates the BWR message at the eNB may be constantly trying to predict the upstream traffic that may egress from the eNB several subframes in the future. Despite the BWR predictor's best efforts, HARQ failures and packet segmentation may cause differences between the amount of expected data and the actual data that the leaves the eNB. In addition, timing errors such as poor synchronization, DOCSIS grant jitter, and packet egress jitter may cause the packets to miss the grants. The accuracy of the BWR predictor algorithm and error correction process may be differentiating aspects.

For instance, on the eNB side, an in-depth understanding of the eNB's own software processes may be a good start to developing a good BWR predictor process that creates accurate BWRs. For example, knowing the timing statistics about the LTE UL stack and Ethernet device may be helpful to predicting when packets may egress the eNB, if hard real-time code cannot be written to ensure packets egress at an exact time.

On the DOCSIS side, the CMTS may observe the predicted behavior and actual DOCSIS grant usage. The CMTS may then help to manage the error by either increasing the buffer delay in the CM or by doing active buffer management on the CM and sending extra grants when the buffer increases in size.

When errors do occur, the BWR itself may be used to address inaccuracies. For instance, when transport blocks fail to be decoded successfully, the eNB re-requests enough bytes for the future re-transmission.

The eNB predictor may be even more proactive and may monitor the amount of data leaving the Ethernet device. When the actual upstream data differs from the predicted upstream data, the eNB may communicate this difference to the CMTS by subtracting the bytes from the BWR offset it originally requested and add the bytes to a new offset.

Figure 16:
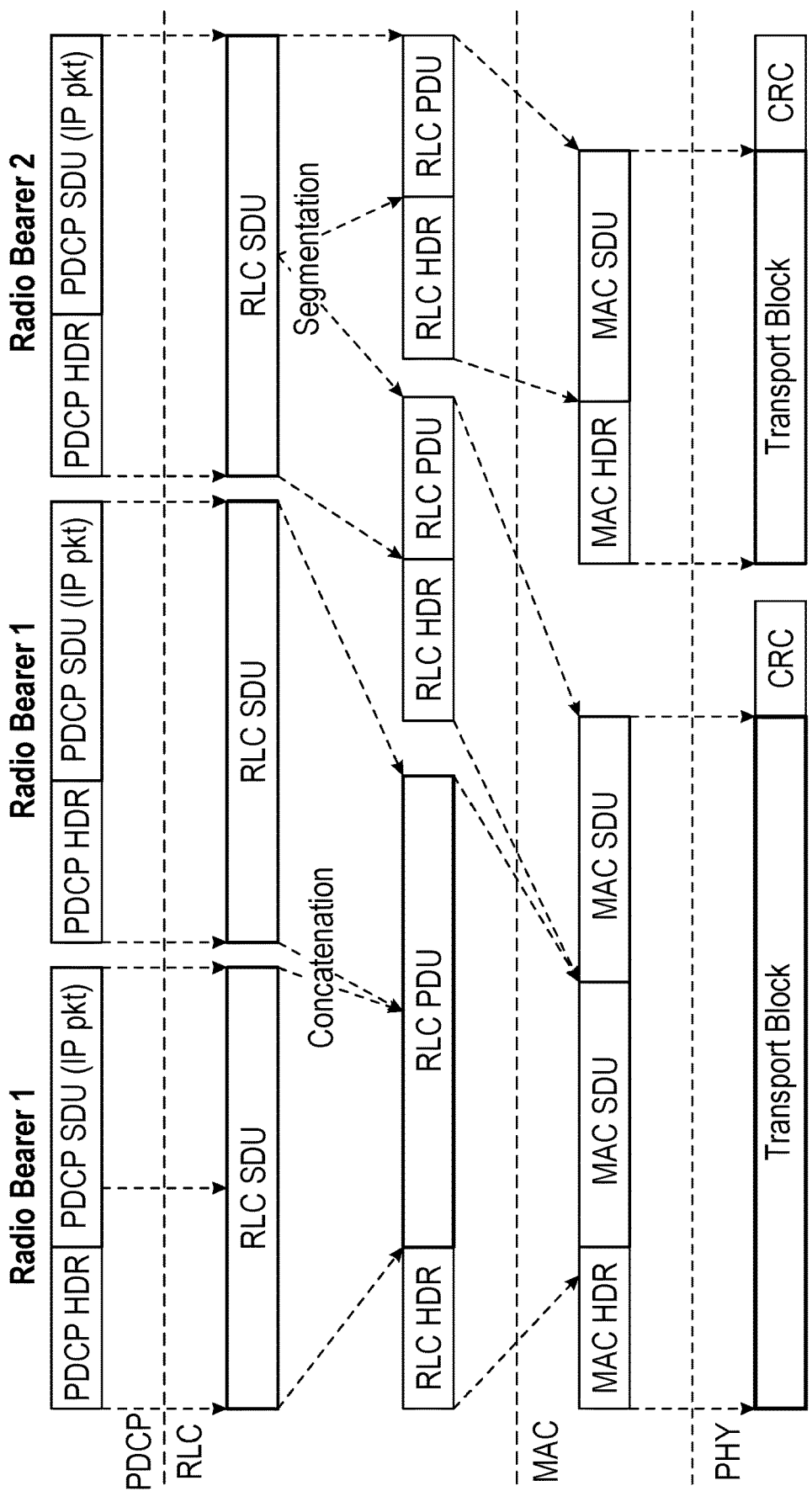
FIG. 16 illustrates eNB Uplink (UL) concatenation.

FIG. 16 illustrates eNB UL concatenation. The eNB predictor may adjust its request byte count based on any additional encapsulation bytes that may have occurred between the mobile air interface and the Ethernet interface. The eNB predictor may indicate in the BWR message the expected egress bytes as the sum of the two PDCP SDUs for the first subframe (the first transport block). However, since the eNB predictor may not have visibility at the packet boundary level at the UE, it may not accurately subtract the various headers (PDCP, RLC, MAC) that the UE included in the BSR. This may result in eNB over-predicting the expected egress bytes.

The BWR may comprise a signaling message that may get sent to the Ethernet interface. Depending on how the queuing is done, it may need to be assigned a separate QoS level from data. If the BWR goes to a separate queue on the CM with a rtPS or unsolicited grant service (UGS) flow, then the byte count of the BWR message may not be accounted for in the service flows that carry the EPS bearers. If BWR is given high priority and placed on a common service flow, then it does have to be accounted for. The LTE-DOCSIS system may have to account for the network bandwidth used by the BWR message. This may depend upon the CM queuing configuration.

If the BWR message is predicting 8 ms in the future, then it may have 8 ms to complete its journey from the eNB to the CMTS and for the CMTS to issue a grant. In practice, the CMTS may need the BWR message before it runs its upstream scheduler and MAP builder routine. That MAP routine may be run early depending on the MAP advance time that the CM requires. If the MAP interval is 2 ms and the MAP advance time is 2 ms, and there is some margin added, then the BWR may need to arrive 5 ms early. If the eNB takes 1 ms to generate and transmit the BWR, then that may leave 2 ms of margin.

This may mean that it is important that, when the BWR message arrives at the CM, the BWR is transmit to the CMTS as quickly as possible. Additional latencies, such as contention in a request slot, may cause the BWR to arrive at the CMTS too late. To avoid contention delays, scheduling algorithms such as rtPS or UGS may be used.

Since the BWR may be a variable length message, UGS may not be the best choice unless the size of the BWR can be fixed or the UGS grant is made larger or equal to the length of the longest BWR message.

One option for sending BWR messages over Ethernet and DOCSIS may comprise UDP encapsulation. While UDP may add little overhead compared to TCP, UDP may not be considered reliable.

To make the LTE-DOCSIS system more robust, the BWR message may include a sequence number to help the CMTS detect a dropped BWR message. Note that if the eNB has no data to send, it does not send a BWR message with the same processing time and expected egress bytes. Therefore, the absence of the BWR offset and its associated requested bytes alone may not be used to detect dropped BWR messages.

Many communications systems use retransmissions to ensure data is received at the receiver. In the case of the BWR message, there may not be enough time to detect BWR message loss and re-transmit the original BWR message since a margin of only 2 ms is left in the system as described above. Consequently, re-transmission may not be a viable solution.

A solution may be to duplicate the requested bytes per BWR offset and BWR flow within a BWR message over "N" BWR messages. The number of duplicate messages "N" may be configured at the eNB and may comprise, for example, a value of three. The duplication of the requested bytes over a few (e.g., three) messages may keep the total bandwidth requirements low while helping to increase the reliability of the LTE-DOCSIS system.

With the introduction of BWR, there may be two request mechanisms, the external layer 3 BWR message request mechanism and the DOCSIS native layer 2 CM request mechanism.

When data packets from the eNB arrive at the CM, the CM generates a DOCSIS request message (REQ) if the grant from the BWR is not immediately available at CM. When the CM BE flow requests its own grant, two grants, one from REQ and one from BWR, can be generated for the same data, which may lead to wasted bandwidth if those duplicate DOCSIS grants are not used.

The CM BE flow request behavior may be dependent on the CM hardware implementations and may be hard to predict. The BWR message may contain all the request information that may be needed for the data path so the additional requests from the CM BE flow could be disabled or ignored. In practice, mismatches between the BWR's predicted bandwidth request and the actual upstream data from the eNB may occur, and the CM's BE flow's requests may be useful in managing buffer build-up.

One solution may be to keep the CM's BE flow's requests enabled and ensure that the BWR is scheduled in a timely manner to prevent the CM from making duplicate requests. This may mean that good synchronization and accurate prediction of when the data may leave the eNB and arrive at the CM may be needed. In addition, the CMTS may reduce duplicate messages by detecting the duplicate BE flow requests and ignoring the duplicates.

A rogue eNB could intentionally request more bandwidth than it needed if it wanted to try to reduce its latency as much as possible at the expense of wasted DOCSIS grants and potentially other customer's QoS. One process to ensure the BWR is not abused may be to check if the upstream data flow matches the grants requested. If the eNB is using about all the grants it asks for there may be no reason for concern. On the other hand, a rogue eNB that is requesting more bandwidth than it needs may only be using a fraction of the grants it asks for. The CMTS may flag the eNB by measuring the eNB's grant utilization and enforcing restrictions when poor utilization or other bad behavior is observed. Once an eNB is flagged, the CMTS may limit the maximum traffic or scale back the size of the grants dynamically based on the grant utilization of the eNB in question.

The LTE internal scheduling time may comprise 8 ms or more. That may provide enough time for the BWR message to be generated and delivered to the CMTS before the packets arrive at the CM. With New Radio (NR), the internal scheduling time may be one to two milliseconds. Thus, the BWR message may arrive at the CMTS scheduler after the data arrives at the CM. To accommodate this, the CMTS scheduler may have to predict the number of grants required per queue, verify this a few milliseconds later when BWR arrives, and adjust as necessary.

The aforementioned architecture included a physical integrated CMTS and a physical integrated small cell. Consistent with embodiments of the disclosure there may be variations of this architecture for which BWR may also work. The CMTS may be an integrated CMTS, a physical CMTS-Core with Remote PHY, or a Cloud CMTS with Remote PHY. The Remote PHY architecture may use a Remote PHY Device (RPD).

Figure 17:
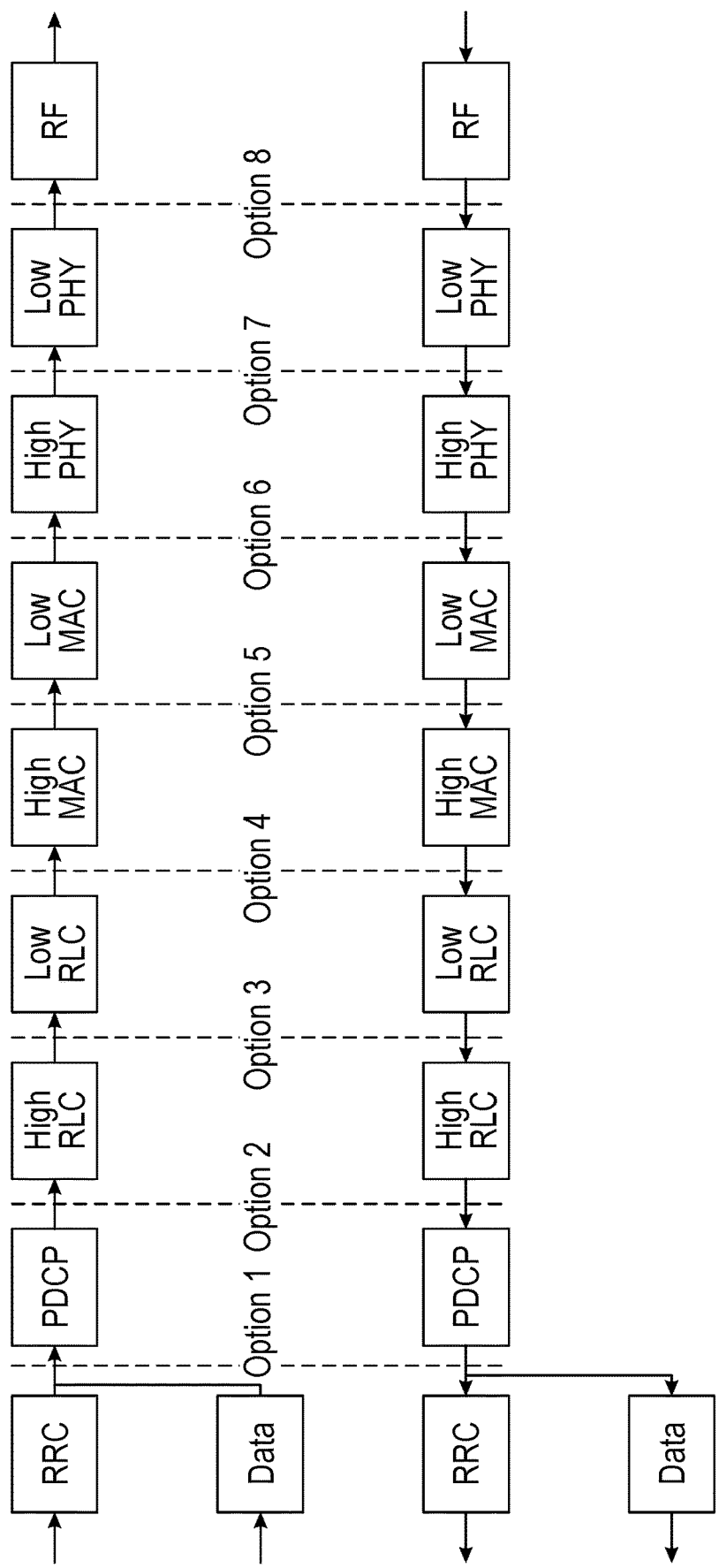
FIG. 17 illustrates Radio Access Network (RAN) functional split options.

FIG. 17 illustrates Radio Access Network (RAN) functional split options. The eNB may be integrated or one of eight proposed split configurations as shown in FIG. 17. The split eNB may be referred to as a virtualized RAN (vRAN) or Cloud RAN.

Figure 18:
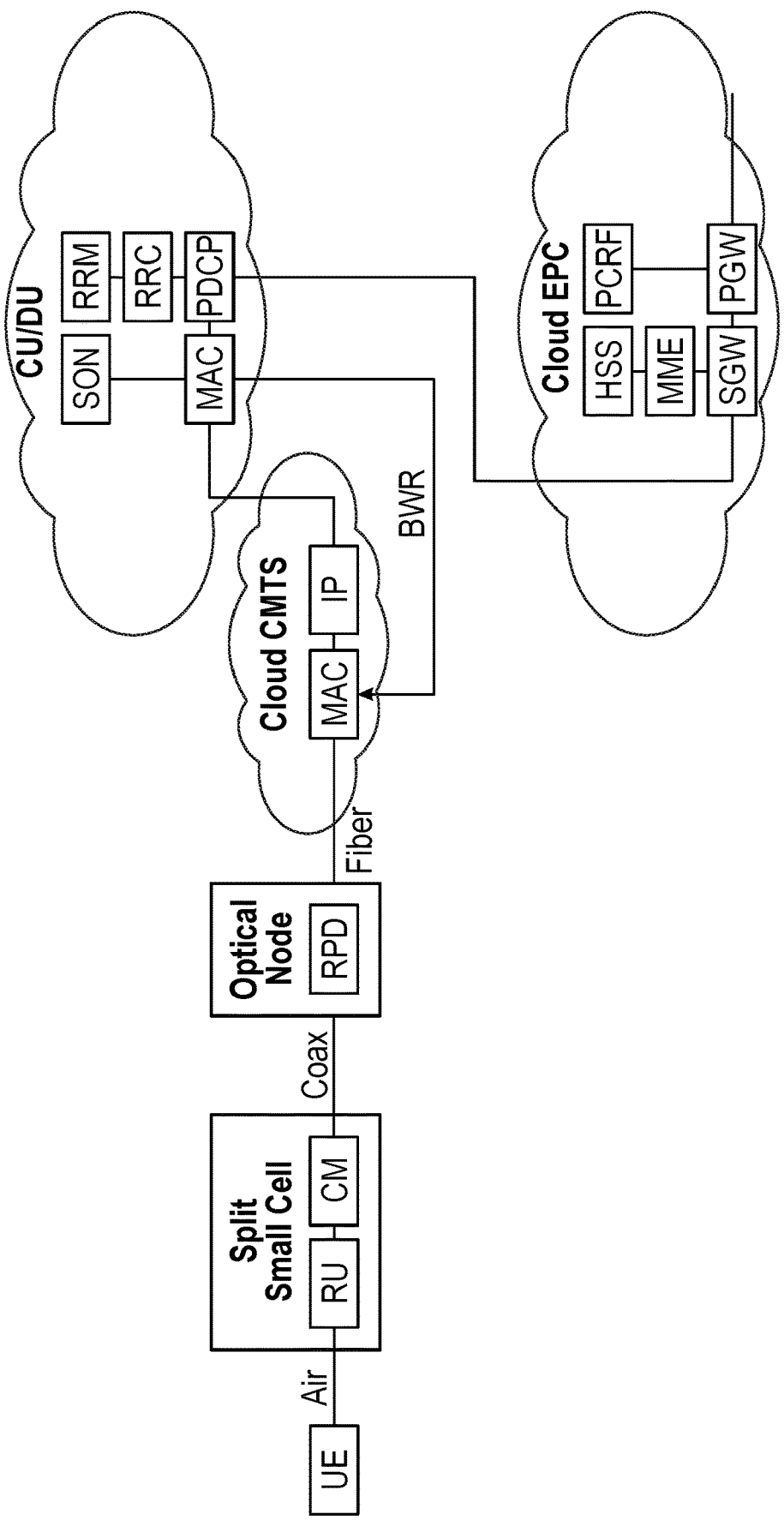
FIG. 18 illustrates Bandwidth Report (BWR) with virtual RAN (vRAN) and Cloud CMTS.
Figure 19A:
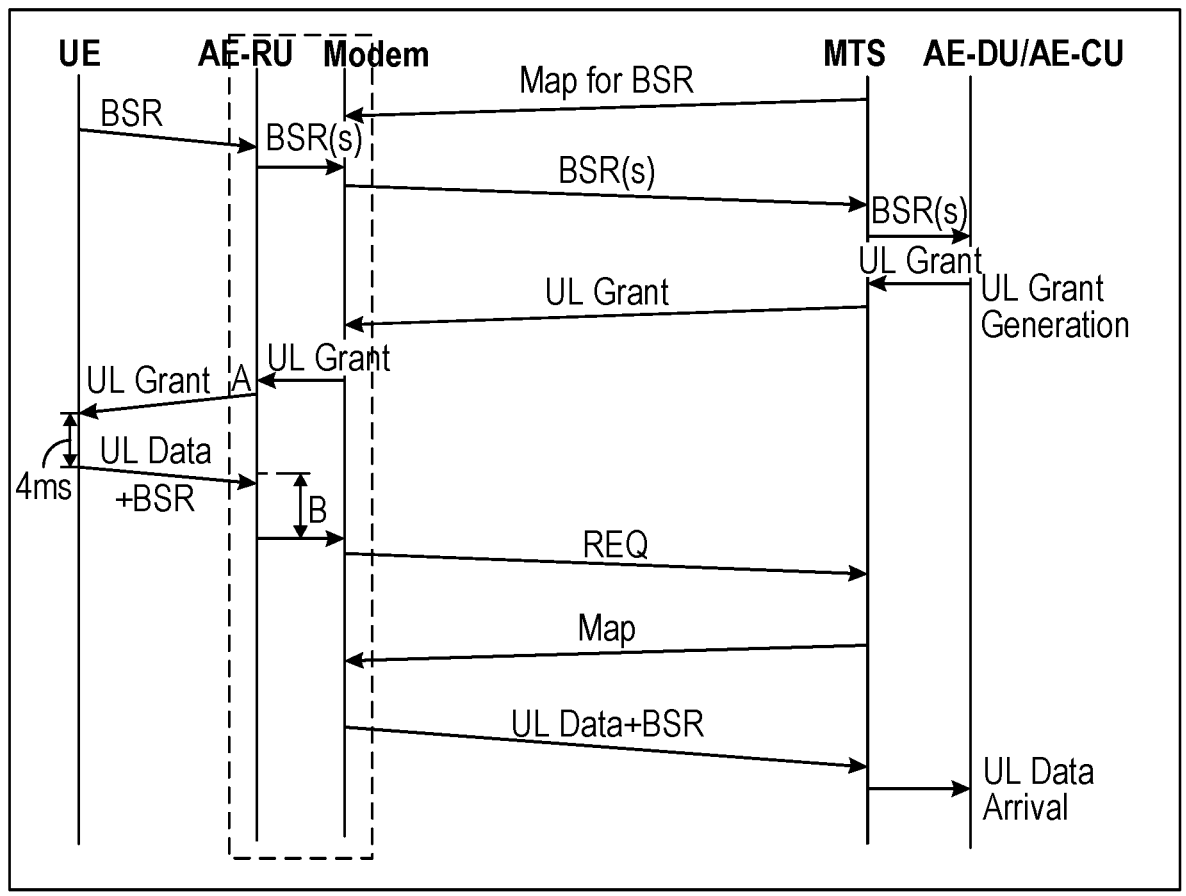
FIG. 19A illustrates a conventional system without BWR.
Figure 19B:
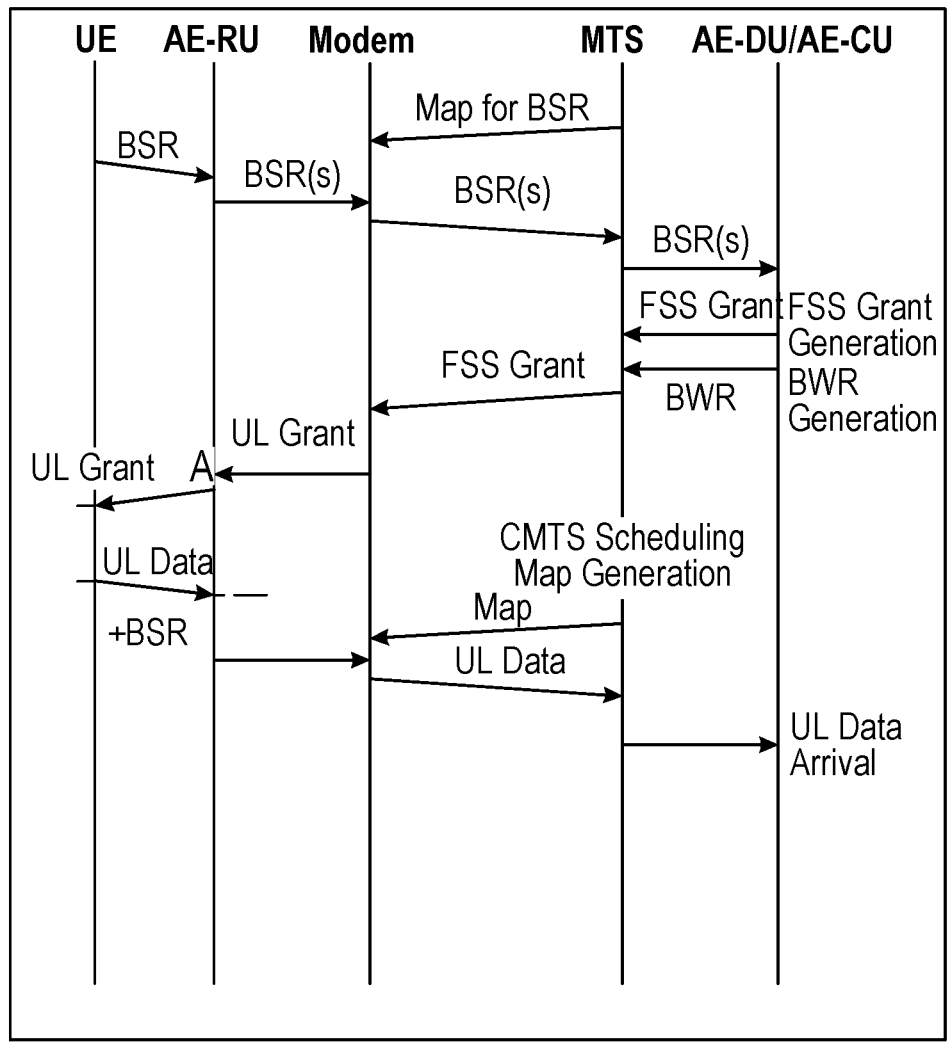
FIG. 19B illustrates BWR Message Flow for Fronthaul with Cloud MTS.

FIG. 18 illustrates BWR with vRAN and Cloud CMTS. As shown in FIG. 18, split CMTS may support a lower layer split option such as option 7, where a Cloud CMTS may be collocated with a Cloud RAN where the eNB scheduler may be located in the cloud. FIG. 19A illustrates the system without BWR. Consistent with embodiments of the disclosure, the BWR message may be passed between software processes within the cloud, as shown in FIG. 19B. The latency for getting BWR from the eNB to the CMTS may be reduced now that BWR does not have to traverse up the CMTS access. As a result, the BWR message could be sent less often.

BWR may also not need to include any bandwidth estimation for signaling that would originate and terminate in the cloud. Further, the X2 traffic from eNB to eNB might also be exclusively in the cloud and thus also achieve low latency.

The migration to vRAN may modify the scope of the DOCSIS data path requirements from backhaul to fronthaul. In a backhaul scenario with an integrated AE, the data packets may be fully formed packets and may be a tunneled version of the original packets from the original application. In a fronthaul scenario, the content may be an interim form that originates from some midpoint in the AE processing chain.

The fronthaul technology may be a transport that has QoS attributes attached to the data flow. The reason for this may be that transport networks may be multi-hop (meaning one or more routers) and bandwidth may be queued and aggregated. A device like an eNB may have a traffic profile that may contain high priority and lower priority traffic. The task for the network may be to maintain that traffic profile through the network.

With a split small cell where the signaling messages between the UE and the eNB now travel to the cloud, QoS may be required to provide a low latency path for UE signaling. QoS may work best with high priority, low bandwidth flows.

Figure 20:
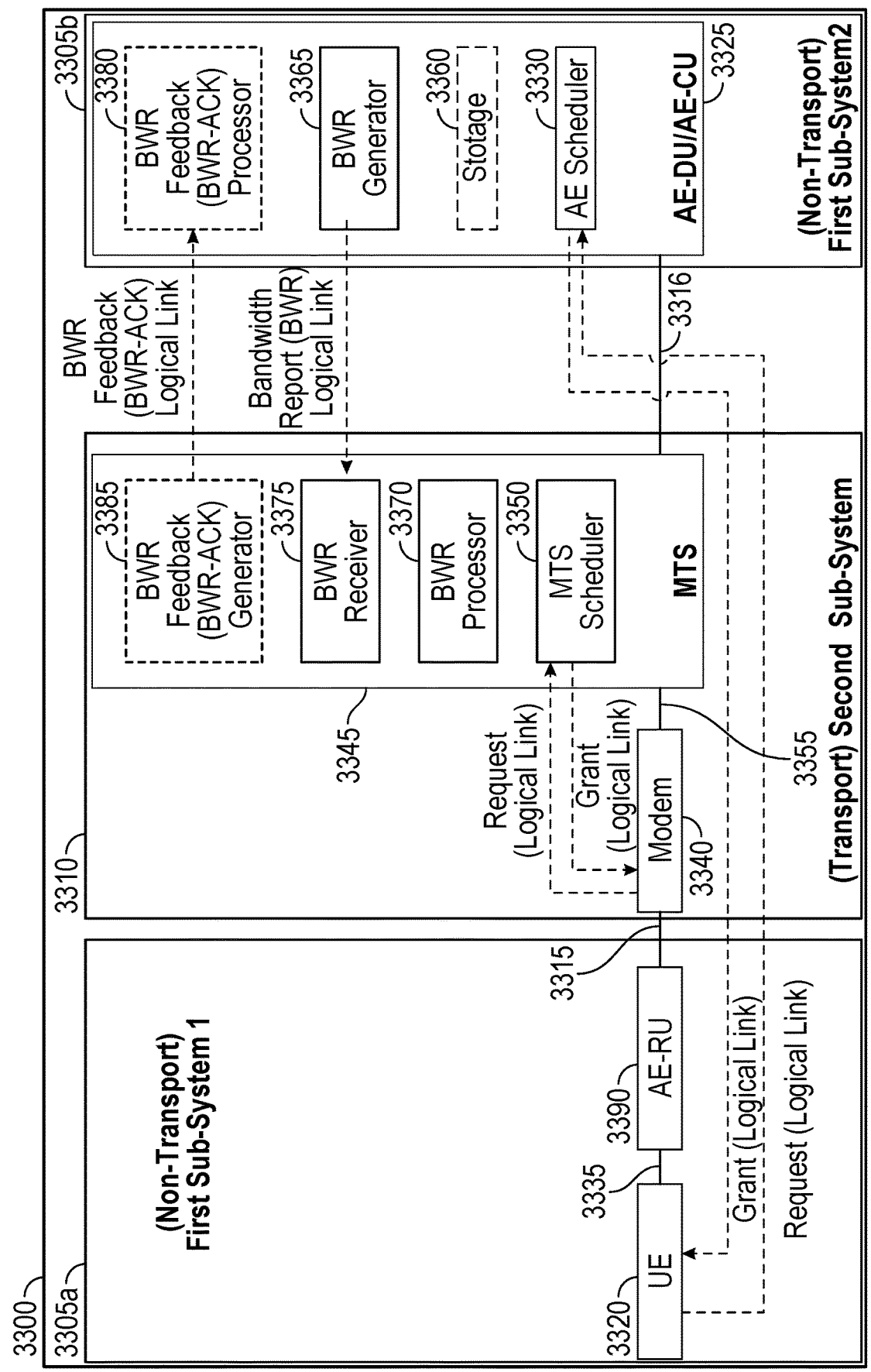
FIG. 20 is a block diagram of a pipelined system for fronthaul.

FIG. 20 shows a pipelined system 3300 for fronthaul. As shown in FIG. 20, pipelined system 3300 may comprise a first sub-system 3305 and a second sub-system 3310. First non-transport sub-system 3305 may comprise User Equipment (UE) 3320, an AE Remote Unit (AE-RU) 3390. Implementing Option 6 or 7 or 8 as described in FIG. 17, AE is split into AE-RU 3390 and AE Distributed Unit (AE-DU)/AE Central Unit (AE-CU) 3325. AE-DU/AE-CU 3325 may comprise an AE scheduler 3330, an optional storage 3360, a BWR generator 3365, and an optional BWR feedback (BWR-ACK) processor 3380. BWR generator 3365 and BWR-ACK processor 3380 may reside inside AE scheduler 1330, but may be separately resided in AE-DU/AE-CU 3325. UE 3320 may be connected to node 3390 via a first system interface 3335. Second transport sub-system 3310 may comprise a modem 3340, a Modem Termination System (MTS) 3345. MTS 3345 may comprise an MTS scheduler 3350, a BWR processor 3370, BWR receiver 3375, BWR processor 3370, and an optional BWR feedback (BWR-ACK) generator 3385. BWR processor 3370 may be an application programming interface (API) that converts BWR message to a format that the MTS scheduler 3350 can understand. BWR processor 3370 may reside inside MTS scheduler 3350, or may be separately resided in MTS 3345. Modem 3340 may be connected to MTS 3345 via a second system interface 3355. AE-RU 3390 is connected to modem 3340 by a pipeline system interface 3315.

Note that the MTS 3345 may further be split into a remote unit MTS-RU such as for example an remote PHY device (RPD) and a central unit MTS-CU. In this case, PHY layer may reside in MTS-RU, MTS scheduler 3350, BWR processor 3370, BWR receiver 3375, BWR feedback (BWR-ACK) generator 3385 may reside in MTS-CU.

Together AE-RU 3390 and AE-DU/AE-CU 3325 may comprise, but is not limited to, a small cell sub-system, a macrocell sub-system. AE-RU 3390 and AE-DU/AE-CU 3325 may use applications comprising, but not limited to, Long-Term Evolution (LTE) broadband cellular network applications, Fourth Generation (4G) broadband cellular network applications, Fifth Generation (5G) broadband cellular network applications, Wi-Fi, DOCSIS, PON (EPON, GPON, SIEPON), satellite, microwave, and RF for example. Second sub-system 3310 may comprise, but is not limited to, a Hybrid Fiber Coax (HFC) system that uses DOCSIS, a network that uses PON such as Ethernet Passive Optical Network (EPON), GPON, SIEPON, and a wireless networks such as Wi-Fi, LTE, 4G, 5G, 6G, Integrated Access Backhaul (IAB), and microwave networks, for example. Pipeline system interface 3315 may be an interface, such as but is not limited to, a Wi-Fi interface, a 4G interface, a 5G interface, an RF interface, an Ethernet network interface (e.g., a Gigabit Ethernet connection), or may be connected via a bus, such as an onboard bus.

UE 3320 may comprise, but is not limited to, a tablet device, a mobile device, a smart phone, a telephone, a remote control device, a set-top box, a digital video recorder, a modem such but not limited to as a cable modem or a PON (PON, EPON, GPON, SIPON, etc.) modem, a personal computer, a network computer, a smart TV-like device, a network storage device, a network relay device, a cell or access point (e.g., macrocell, microcell, femtocell, nanocell, and Wi-Fi Access Point in a multi-hop communication network) or other similar microcomputer-based device capable of using first sub-system 3305. AE-RU 3390 and AE-DU/AE-CU 3325 may comprise a device that is connected to a mobile telephone network that may communicate directly and wirelessly with mobile handsets (e.g., UE 3320). AE-RU 3390 may comprise, but is not limited to, an eNB, a gNB, an 802.11ax Wi-Fi Access Point (AP), a cable MTS, a EPON termination system (OLT or equivalent), a GPON termination system, a SIEPON termination system, satellite modem termination system (SMTS or equivalent), a RF node, or an IAB node for example. First system interface 3335 may comprise but not limited to a Hybrid Fiber-Coaxial (HFC) network, a PON network, a satellite network, a Wi-Fi network, a 4G network, a 5G network, a 6G network, any other RF based network, or an IAB network. AE scheduler 3330, located in AE-DU/AE-CU 3325 and working in cooperation with AE-RU 3390, may provide and manage a request-grant loop for traffic from UE 3320 to AE-RU 3390 on first sub-system 3305a. A predictor (not shown) may reside in or be in communication with AE scheduler 3330 or BWR generator 3365.

Modem 3340 may comprise, but is not limited to, a Cable Modem (CM), a PON modem (ONU or equivalent), a satellite modem (SM or equivalent), or a Wi-Fi node. MTS 3345 may comprise, but is not limited to, a Cable Modem Termination System (CMTS), a EPON termination system (OLT or equivalent), a GPON termination system, a SIEPON termination system, satellite modem termination system (SMTS or equivalent), or an IAB node. Second system interface 3355 may comprise but not limited to a Hybrid Fiber-Coaxial (HFC) network, a PON network, a satellite network, a Wi-Fi network, a 4G network, a 5G network, or an IAB network. MTS scheduler 3350 may comprise a CMTS scheduler, a PON scheduler (EPON, GPON, SIEPON), a Wi-Fi scheduler, a satellite scheduler, a 4G scheduler, a 5G scheduler, a 6G scheduler, or an IAB scheduler, and may provide and manage a request-grant loop for traffic from modem 3340 to MTS 3345 on second sub-system 3310. A pre-processor (not shown) may be reside on MTS scheduler 3375 or BWR processor 3370.

Elements of pipelined system 3300 (e.g., UE 3320, AE 3325, AE scheduler 3330, modem 3340, MTS 3345, MTS scheduler 3350, BWR generator 3365, BWR receiver 3375, and BWR processor 3370) may be practiced in hardware and/or in software (including firmware, resident software, micro-code, etc.) or in any other circuits or systems. The elements of pipelined system 3300 (e.g., UE 3320, node 3325, node scheduler 3330, modem 3340, MTS 3345, MTS scheduler 3350, BWR generator 3365, BWR receiver 3375, and BWR processor 3370) may be practiced in electrical circuits comprising discrete electronic elements, packaged or integrated electronic chips containing logic gates, a circuit utilizing a microprocessor, or on a single chip containing electronic elements or microprocessors. Furthermore, the elements of pipelined system 3300 (e.g., UE 3320, node 3325, node scheduler 3330, modem 3340, MTS 3345, MTS scheduler 3350, BWR generator 3365, BWR receiver 3375, and BWR processor 3370) may also be practiced using other technologies capable of performing logical operations such as, for example, AND, OR, and NOT, including but not limited to, mechanical, optical, fluidic, and quantum technologies. As described in greater detail below with respect to FIG. 24, the elements of pipelined system 3300 (e.g., UE 3320, node 3325, node scheduler 3330, modem 3340, MTS 3345, MTS scheduler 3350, BWR generator 3365, BWR receiver 3375, and BWR processor 3370) may be practiced in a computing device 2400.

During operation, UE 3320 may make a request for bandwidth to AE 3325, which is received by AE scheduler 3330. When AE scheduler 3330 makes a grant decision, which could be before, during, or after, a grant is sent to the UE, a BWR message may be sent from AE-DU/AE-CU 3325, e.g., by AE scheduler 3330 or BWR generator 3365, to MTS scheduler 3350 (or optionally via BWR receiver 3375). Although FIG. 20 depicts the logical link on which the BWR message is sent, the BWR message is physically sent on interface 3316. Without the present systems and methods, modem 3340 would need to wait for the first sub-system traffic to arrive at modem 3340, and then makes a bandwidth request to MTS scheduler 3350. The MTS scheduler 3350 would then schedule a second sub-system (SSS) grant to transport the first sub-system traffic across the second sub-system. However, utilizing the present systems and methods, the second sub-system request-grant process may be eliminated or shortened, which results in significantly reduced latency on second sub-system 3310 and end-to-end system 3300.

In computing the BWR message content, the AE scheduler 3330 may compute the size of the first sub-system traffic to be sent across the second sub-system 3310 by taking into account the configuration of the fronthaul flows. In other words, unlike the backhaul case described in FIG. 13 where the size of the first sub-system traffic to be sent across the second sub-system may be based on the bytes granted by the AE scheduler to the UE, for the fronthaul case, the fronthaul flow configuration needs to be considered. The fronthaul flow configuration may include factors such as but not limited to, which Split Option, as described in FIG. 17, is implemented in the first sub-system 3305.

To ensure appropriate QoS information is conveyed from first sub-system 3305 to second sub-system 3310, the AE-DU/AE-CU (e.g., AE scheduler 3330) may inform AE-RU 3390 of the mapping between a resource block (RB) and DSCP or VLAN, Ethernet Class of Service (CoS), Ethernet P/Q bit, or any other QoS identifier previously mentioned, hereinafter denoted as RB2QM (RB to QoS Mapping). The RB is a resource in frequency and time. In other words, AE-RU 3390 is configured with QoS identifiers for the traffic to be received in an RB. AE-DU/AE-CU 3325, e.g., AE scheduler 3330, may inform AE-RU 3390 the RB2QM dynamically around the time AE-DU/AE-CU 3325, e.g., AE scheduler 3330, generates grants for UE 3320, or statically or substantially statically such as when RB2QM changes.

The foregoing assumes AE-RU 3390 has the ability to extract each RB data separately and encapsulate RBs separately. In another embodiment, AE-RU 3390 is configured to separate user plane (UP), control plane (CP), management plane (MP), and synchronization plane traffic (SP). AE-DU/AE-CU, e.g., AE scheduler 3330, may inform AE-RU 3390 of the mapping of UP, CP, MP, and SP traffic to a QoS identifier such as a DSCP, VLAN, Ethernet Class of Service (CoS), Ethernet P/Q bit, or an identifier for example assigned by the operator. Denote this mapping as TT2QM (Traffic Type to QoS Mapping).

In yet another embodiment, AE-DU/AE-CU 3325 may grant traffic of same or lower QoS class, e.g., priority, in a time interval, such as a LTE subframe, a 5G slot, or a DOCSIS OFDM frame, etc. AE-DU/AE-CU 3325 may inform AE-RU 3390 of the mapping of a time interval to a QoS identifier for the QoS class, such as a DSCP, VLAN, Ethernet Class of Service (CoS), Ethernet P/Q bit, or an identifier for example assigned by the operator. Denote this mapping TI2QM (Time Interval to QoS Mapping).

AE-DU/AE-CU, e.g., AE scheduler 3330 or BWR generator 3365, generates a BWR message which it sends to MTS 3345. The content of the BWR message may include a BWR Offset equal to the scheduled time interval, one or more BWR Flow ID(s) indicating QoS identifier(s) of the traffic expected from AE-RU 3390, and the Bytes Requested as the amount of bytes expected from AE-RU 3390 for that time offset and for that BWR Flow ID.

When AE-RU 3390 receives traffic from UE 3320, AE-RU 3390 encapsulates the traffic with IP or Ethernet and/or any other header needed, which includes appropriate QoS identifier using appropriate mapping of RB2QM, TT2QM, or TI2QM. AE-RU 3390 then forwards the traffic to second sub-system 3310.

Using the BWR message, the AE scheduler 3330 may indicate the traffic to be sent from the from UE 3320 to AE-RU 3390, which will then pass to the second sub-system 3310. Although one UE 3320 is shown, BWR message may indicate the traffic to be sent from a plurality of UEs.

Based on the BWR message, the second sub-system 3310 has already scheduled one or more second sub-system (SSS) grants for transmitting traffic associated with the BWR message from the first sub-system 3305 on the second sub-system 3310 across link/interface 3355. The second sub-system 3310 may transmit the traffic based on the scheduled SSS grants. In other words, the BWR message describes the first sub-system traffic to be sent across the second sub-system 3310, e.g., link/interface 3355, before the traffic actually arrives at the second sub-system 3310, e.g., at modem 3340. The second sub-system 3310 may then utilize the BWR messages to ensure SSS grants are in place around the time the traffic has arrived at modem 3340 from the first sub-system 3305. Described another way, the BWR message is a mechanism of the first sub-system 3305 for indicating to the second sub-system 3310 what will come in the future. Described yet another way, embodiments of the disclosure may start the request-grant loop in second sub-system 3310 early and in parallel, before the request-grant loop in the first sub-system 3305's grant process is completed. In this way, the overall latency for pipelined system 3300 may be reduced.

Message Formats of the BWR Messages

FIG. 21 illustrates a BWR packet format. The BWR message may comprise a packet, e.g., an IPv6 or IPv4 UDP packet, that may be sent from the AE, e.g., AE 1325, AE-DU/AE-CU 3325, AE scheduler 1330, 3330, or BWR generator 1365, 3365, to the MTS, e.g., MTS 1345, 3345, BWR receiver 1375, 3375, MTS scheduler 1350, 3350. The AE may format the BWR messages as shown in FIG. 20 and BWR Message Elements as shown in Table 3. As shown in Table 3, A bits may be, but is not limited to 3 bits, S bits may be, but is not limited to 5, B bits may be, but is not limited to 48, C bits may be, but is not limited to 48, D bits may be, but is not limited to 32, E bits may be, but is not limited to 8, F bits may be, but is not limited to 8, G bits may be, but is not limited to 8, and H bits may be, but is not limited to 24.

TABLE 3

| Information Element | Size | Description |
| --- | --- | --- |
| BWR Header (18 bytes) | | |
| Version number | A bits | Version number of BWR message |
| Sequence number | S bits | Used for detecting dropped messages |
| AE Identifier | B bits | Device unique identifier |
| BWR Base seconds | C bits | Absolute time value directly derived from the 1588v2 timestamp and corresponding to the generation of the BWR contents of the BWR message. |
| BWR Base sub-seconds, e.g., nanoseconds | D bits | |
| BWR Table Size | E bits | The number of row entries. |
| BWR Row (Repeated, N * 5 bytes) | | |
| BWR Offset | F bits | Offset in units of sub-seconds, e.g., 2^16 nanoseconds that is added to the BWR Base nanoseconds value to obtain when the bytes will egress the AE, e.g., AE 1325, AE-RU 3390. |
| BWR Flow ID | G bits | User Defined Flow ID, or latency class |
| Bytes Requested | H bits | These are the bytes per BWR flow per time interval that cross the Ethernet Interface. The bytes are counted based upon a complete Ethernet frame including the CRC. |

The BWR message as shown in FIG. 21 may comprise a packet, e.g., an IPv6 or IPv4 UDP packet where: i) the source address may comprise the address of the AE, e.g., source IP address of the AE; ii) the destination address may include the address of the MTS, e.g., MTS System Identifier for the BWR to be sent to; iii) the destination port, e.g., UDP destination port, may be defined by the MTS System Identifier for the BWR to be sent to. The contents of the packet may contain the BWR message elements as described in Table 3, and may be followed by a digital signature described below.

Regarding the header of the BWR message, the version field may be set to 1. The sequence field may be incremented by one for each BWR message sent and continuously wraps after a count of S, e.g., 32, see table 3 above. The AE identifier is the identifier of the AE, e.g., the identifier of AE 1325, AE-DU/AE-CU 3325, AE scheduler 1330, 3330, or BWR generator 1365, 3365, and may be user/operator-defined. The AE identifier may allow the MTS to manage and distinguish among multiple AEs and to report statistics with an externally known tag. For LTE devices, the AE identifier may be the Global eNB identifier, which may comprise the combination of Public Land Mobile Network (PLMN)+eNB ID within PLMN. The PLMN may comprise six base10 digits with three integer digits for mobile country code (MCC) and three integer digits for a network code (MNC), for a total of 24 bits. The eNB identifier may be defined as equal to the 20 leftmost bits of the Cell Identity Information Element (IE) as standardized by 3GPP of each cell served by the eNB. Another potential AE identifier may comprise a MAC address of the AE. Alternatively, the AE identifier may comprise an administrative-determined unique value that may be shared in both the CMTS and AE configurations. The 1588v2 timestamp may serve two purposes. First, it may document when the BWR contents were generated. And second, it may be the base number for the BWR offset. The BWR table size may list the number of rows to follow.

Regarding the rows of the BWR message, the BWR offset, when added to the BWR base value, may be the time in the future when the last byte of the packet(s) will egress the AE, e.g., AE 1325 or AE-RU 3390, for this row entry.

Thus, the BWR message may refer to the time that a complete first sub-system packet, for example, leaves the AE or arrives at the modem, e.g., modem 1340, 3340. Alternatively, the BWR offset may be the time in the future when the first byte of the packet(s) will egress the AE, e.g., AE 1325 or AE-RU 3390, for this row entry. The BWR offset may comprise an 8 bit value in units of $2^{16}$ ns (65.536 us). This may give it a max value of $2^{24}$ ns (16.78 ms). This range may be chosen to match the application range, to minimize the value entry, and to allow the byte to be directly register added to the BWR base time.

Each row may have its own BWR offset value. This may have been done for a specific reason. The BWR message may be sent at some periodic rate. That rate may be fast, which for LTE, may be every 1 ms (or for 5G, it may be less than 1 ms); or it may be slower, for example, every 5 ms, to reduce the loading on the AE CPU. By allowing an offset per row, the delivery of the timed requests may be accurate and independent from the delivery of the BWR message.

Each BWR row entry may include a BWR Flow ID and the number of bytes requested. The BWR Flow ID may be user defined, but may be agreed to between the MTS and the AE. There may be one BWR Flow ID per QoS identifier. For example, an LTE eNB may have flow IDs 0 through 3 to describe the four Logical Channel Groups (LCGs). Alternatively, the AE may report only one BWR Flow ID as an aggregate of all bytes requested to the AE during that BWR Offset. If the AE has multiple sectors, the AE may sum the aggregate traffic together per BWR Flow ID. The BWR message may have more than one entry per BWR Flow ID. This may allow for a lower frequency message to cover multiple future events within a flow.

A null BWR message may be sent as a keep-alive message between the AE, e.g., AE 1325, AE-RU 3390, or AE-DU/AE-CU 3325, and the MTS, e.g., MTS 1345, 3345, BWR receiver 1375, 3375, MTS scheduler 1350, 3350. The AE may format the null BWR message with a complete BWR header with the following entries, for example: i) a 1588 timestamp may not be required and may be set to 0. A table size may be set to 0.

A BWR-ACK message may be used to acknowledge the BWR message. The BWR-ACK message may comprise a packet, e.g., an IPv6 or IPv4 UDP, that may be sent from the MTS, e.g., MTS 1345, 3345, BWR-ACK Generator 1385, 3385, to the AE e.g., AE 1325, AE-DU/AE-CU 3325, or BWR-ACK processor 1380, 3380. The MTS may use the same format for the BWR-ACK message as the BWR message where:

A source address may be the address of the MTS, e.g., IP address of the MTS.
An destination address may be the source address of the BWR message, e.g., IP address of the AE.
A source port.
A destination port, e.g., may be defined by the MTS System Identifier.
A version number may be the same as the BWR message.
A sequence number may not be required, or may be set to 0 and may be ignored by the AE.
The AE identifier may be the same as the field used in the BWR message.
A timestamp, such as a 1588 timestamp, may not be required and may be set to 0.
A table size may be set to 0.

The BWR signature may comprise an optional feature that may prevent a BWR message from being accepted from a malicious source that may have performed an IP source address clone. The BWR message may be sent in the clear followed by a digital signature. This may permit implementations to use the contents of the BWR message without decrypting or decoding each packet. For example, a system may be built where the BWR message may be received in real time, but the digital signature may be sampled on a random basis and not verified in real time.

The AE system and the MTS may be configured from a common or cooperative Operations Support System (OSS) that may align the QoS between the two systems. An example of the organization of the data structures is shown in FIG. 22. The system values in FIG. 22 comprises example values only, and is only meant for explanatory purposes.

A Bearer is associated with a QoS Class Identifier (QCI) value. The bearer has a corresponding Logical Channel (LC), which is assigned to a Logical Channel Group (LCG).

In the backhaul case described in FIG. 13, at the AE, the bearer is associated with a GTP Tunnel Endpoint ID (TEID) and a QCI value. The AE also has a mapping between the LC, the LCG, and the bearer. The AE is configured with a mapping between QCI and DSCP. The mapping of QCI to DSCP may be configured by an operator or negotiated between transport and non-transport network operators. The AE is further configured with a mapping of DSCP and BWR Flow ID.

At the AE, incoming packets are received at the AE on a LC, which informs the AE of the packet's QCI value. The AE utilizes the QCI to DSCP mapping to look up the corresponding DSCP. The AE encapsulates the packet into a GTP tunnel, and may further encapsulates the tunnel in another header which includes the corresponding DSCP.

The MTS is configured with a mapping between BWR Flow ID and SFID. The modem is configured with a mapping between SFID and DSCP. It should be understood that the mappings may be a 1-to-1 mapping, or may alternatively be a 2-to-1 mapping.

At the modem, incoming packets from the first sub-system may be classified to queues based upon their DSCP along with other attributes such as the IP Source Address (SA). These modem queues may be managed by the MTS. At the MTS, each SFID may be allocated grants based upon requested bytes per BWR Flow ID in the BWR message.

After reading the present descriptions related to the backhaul case, the skilled artisan would appreciate how to apply the present systems and methods to a fronthaul case.

In one embodiment, the configuration of BWR Flow ID to SFID mapping, and DSCP to SFID mapping for each modem is done through a modem configuration file. The modem configuration file is sent to a modem during modem initialization and registration process. The modem extracts the mapping information from the configuration file, and forms a registration message to the MTS. The MTS then associates the BWR Flow ID to SFID mapping, and DSCP to SFID mapping for that modem.

BWR Protocol Operation
BWR Initialization

Figure 23A:
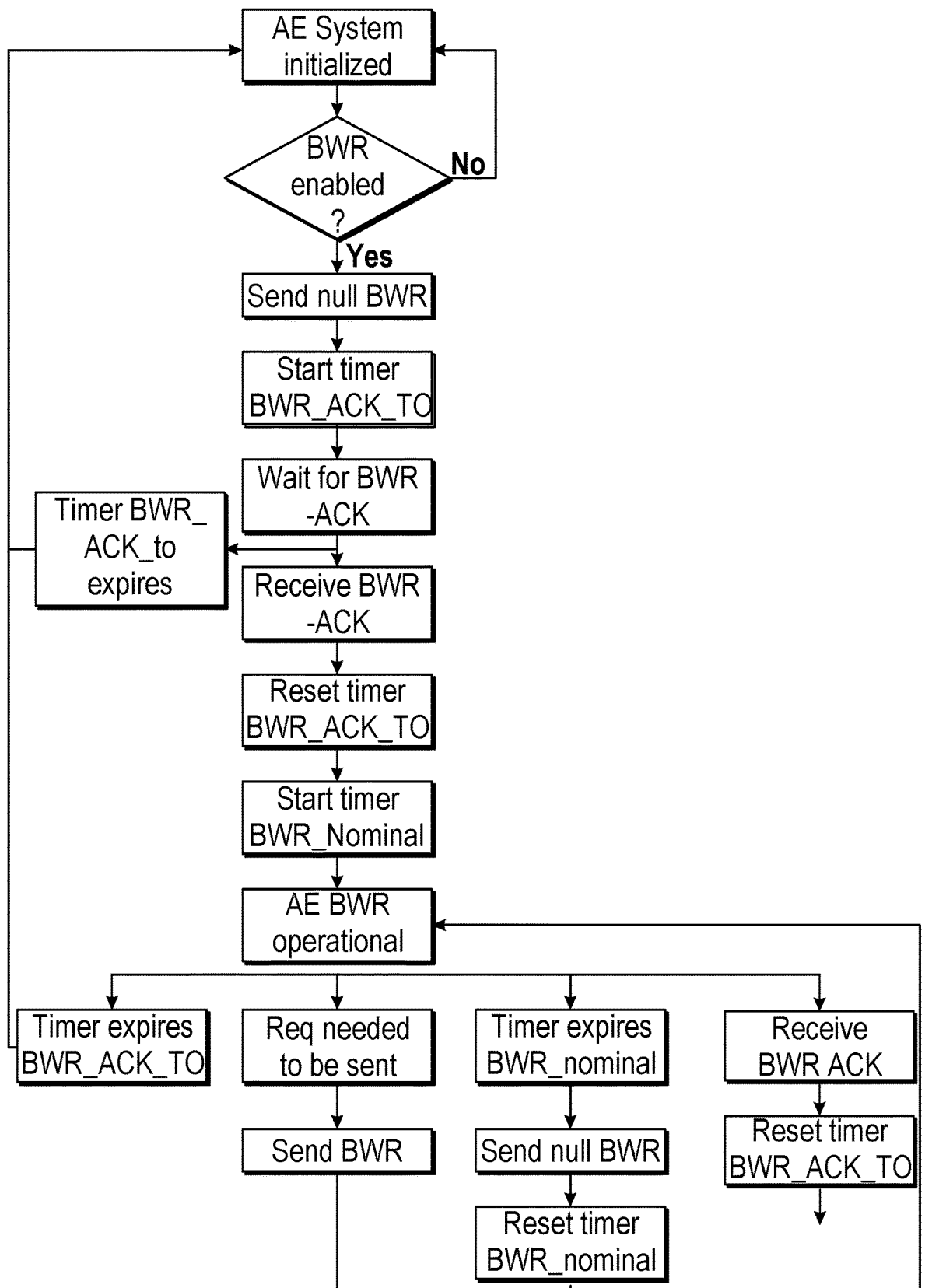
FIGS. 23A, 23B, and 23C are a flow diagram of the BWR protocol operation.
Figure 23B:
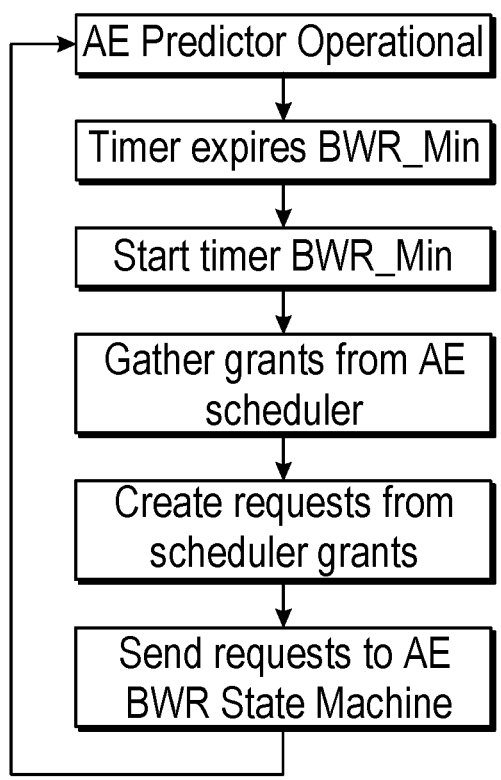
Figure 23C:
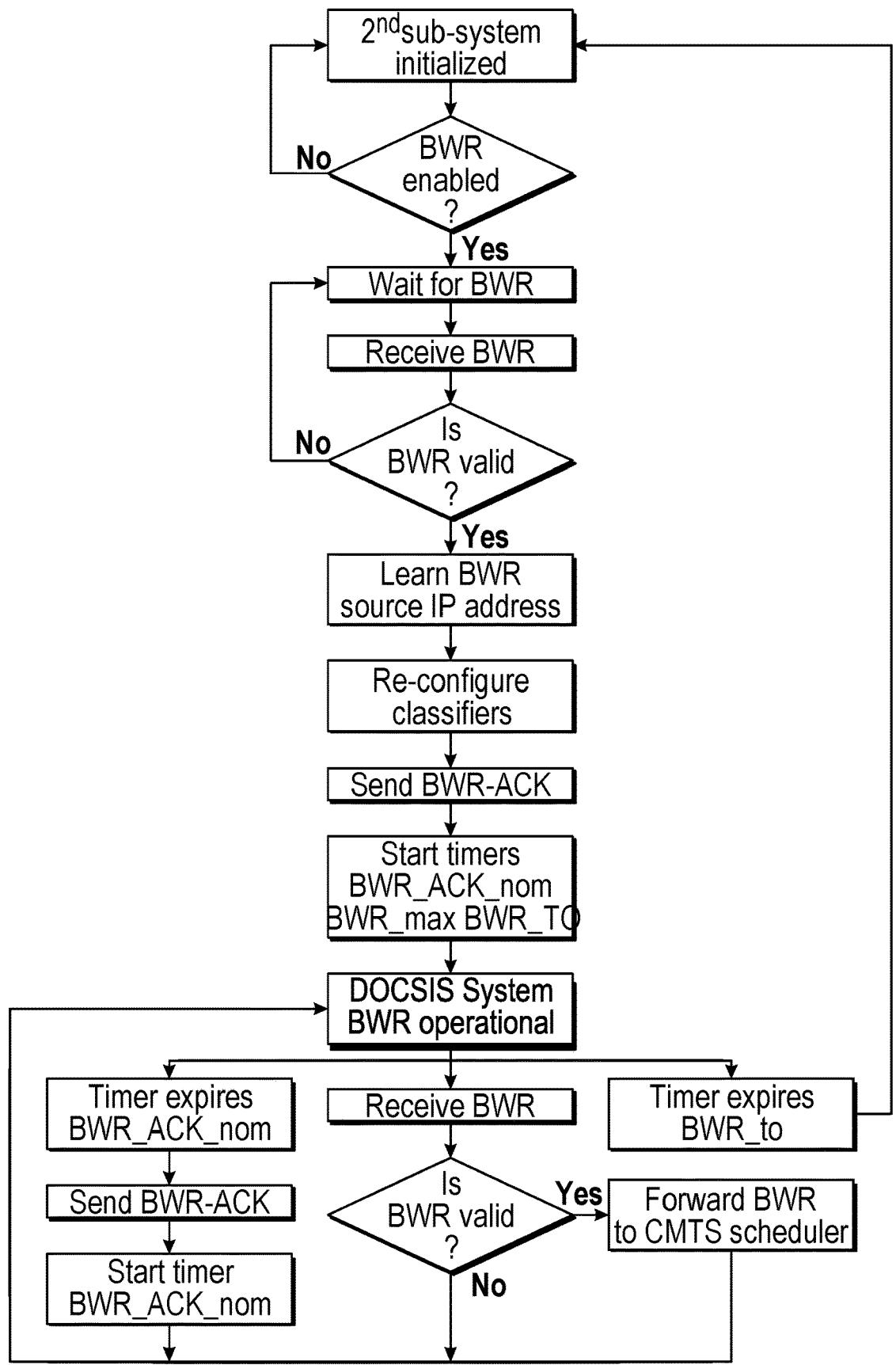

FIGS. 23A, 23B, and 23C are a flow diagram of the BWR protocol operation. The MTS, e.g., MTS 1345, 3345, is operational. The modem, e.g., modem 1340, 3340, boots up and receives its configuration file. The modem configuration file contains BWR specific configuration information. When the modem completes its configuration and registration process, the SSS, e.g., second sub-system 1310, 3310 is considered initialized.

The AE, e.g., AE 1325, or AE-DU/AE-CU 3325, powers up or is powered up and waiting for network connectivity. When network connectivity is achieved, the AE is assigned an IP address. The AE is independently configured with a configuration protocol. This configuration protocol for the AE may be a protocol e.g., TR-069 or it could be a proprietary protocol. The AE configuration protocol contains BWR specific configuration information. When this process is finished, the AE is considered initialized.

The AE 1325 send a null BWR message and wait for a BWR-ACK. This process is repeated until the BWR ACK Timeout Interval (BWR_ACK_TO) is exceeded or a BWR-ACK is received. When a BWR-ACK is received, the AE moves to its BWR operational state.

The SSS may wait for an initial BWR message. The MTS accepts either a null BWR message or an operational BWR message before reaching the BWR operational state. When that message arrives, the SSS may authenticate the AE using the AE ID and validate the BWR message using its digital signature (if configured to do so). The SSS may also learn the IP source address of the AE from the BWR message. After receiving a valid BWR, the SSS sends a BWR-ACK before the BWR-ACK Timeout Interval (BWR_ACK_TO) expires. When the SSS is finished, it may return a BWR-ACK and move into its BWR operational state.

The SSS may decide to include the AE source address, e.g., IP source address, into the modem's DSCP to SFID mapping, e.g., classifiers. This would involve the MTS and the modem exchanging information using a protocol, e.g., DOCSIS dynamic service change protocol, to reconfigure the classifiers in the modem. Using the AE source address would allow AE traffic to be placed on separate service flow from other traffic and keep non-AE traffic from entering the service flow. The AE receives a BWR-ACK and moves into operational state.

The AE and the SSS initialization may occur asynchronously. The AE and the SSS initialization may occur in order.

The AE is configured with QCI to DSCP mapping. The modem is configured with DSCP to SFID mapping, and the MTS is configured with BWR Flow ID to SFID mapping.

BWR Operation

The AE may periodically send a BWR message to the SSS with request information. If there is no internal request information, the AE may not send a BWR message to request bytes. If a BWR message has not been sent for the BWR Nominal Time Interval (BWR_Nominal), then the AE may send a null BWR.

The SSS may capture and process BWR messages. The SSS may generate a BWR-ACK message at least once within the BWR-ACK Nominal Time Interval (BWR_ACK_Nom) as long as at least one valid BWR message has been received within that time interval. The SSS should validate each BWR message based upon its AE ID and digital signature (if configured to do so).

If the SSS does not receive a BWR message within the BWR Maximum Time Interval (BWR_Max), it may suspend its BWR operation and return to the configuration state, i.e., prior to its operational state. If the AE does not receive a BWR-ACK message within the BWR Ack Maximum Time Interval (BWR_ACK_Max), it may suspend its BWR processing and revert back to sending a null BWR once every BWR Ack Maximum Time Interval.

The contents of the BWR message may be generated by an AE predictor, e.g., AE scheduler 1330, 3330, BWR generator 1365, 3365, or a separate predictor entity, which takes its inputs from the AE scheduler and from other operating entities within the AE. The AE predictor gathers the upstream grant information from the AE scheduler over an interval described by BWR Minimum Interval (BWR_Min). This time is usually set to be an integral number of AE subframe or slot times.

The AE predictor may compute the bytes requested based on the grant information from the AE, the interface (e.g., Split option in FIG. 17) between the AE or the AE-RU 3390 and the modem, and to allow for any other conditions such as packet reassembly and retransmits. The AE predictor sends the results to the BWR client signaling state machine.

Figure 24:
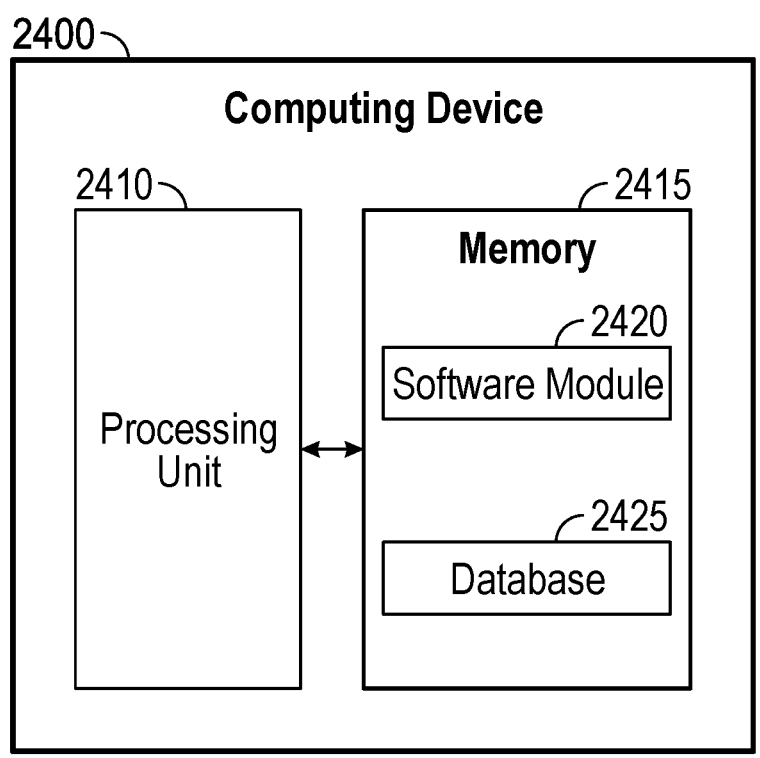
FIG. 24 is a block diagram of a computing device.

FIG. 24 shows computing device 2400. As shown in FIG. 24, computing device 2400 may include a processing unit 2410 and a memory unit 2415. Memory unit 2415 may include a software module 2420 and a database 2425. While executing on processing unit 2410, software module 2420 may perform, for example, processes for providing a quality of service framework for applications as described above. Computing device 2400, for example, may provide an operating environment for UE 1320, 3320, AE 1325, AE-RU 3390, AE-DU/AE-CU 3325, AE scheduler 1330, 3330, modem 1340, 3340, MTS 1345, 3345, and MTS scheduler 1350, 3350. UE 1320, 3320, AE 1325, AE-RU 3390, AE-DU/AE-CU 3325, AE scheduler 1330, 3330, modem 1340, 3340, MTS 1345, 3345, and MTS scheduler 1350, 3350 may operate in other environments and are not limited to computing device 2400.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 13 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 2400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving, from a first sub-system by a second sub-system, a Bandwidth Report (BWR) message corresponding to traffic to be received from the first sub-system by the second sub-system, wherein the BWR message comprises a summary of first grants to be scheduled by the first sub-system for transmitting the traffic through the first sub-system, wherein the BWR message is sent in parallel to scheduling of the first grants, and wherein the BWR message is received prior to receiving the traffic from first sub-system;
scheduling, by the second sub-system based on the summary of the first grants in the BWR message, second grants for the traffic to be received from the first sub-system;
receiving, by the second sub-system from the first sub-system, the traffic; and
transmitting, by the second sub-system, the traffic based on the second grants.

2. The method of claim 1, wherein receiving the BWR message further comprise classifying the BWR message to one of the following: a common low latency queue and a BWR queue dedicated for BWR messages.

3. The method of claim 1, wherein receiving the BWR message comprises receiving the BWR message wherein the BWR message provides a profile of the traffic to be received from the first sub-system.

4. The method of claim 1, wherein receiving the BWR message comprises receiving the BWR message wherein the first sub-system comprises one of the following: Wi-Fi Access Point (AP), an Long-Term Evolution (LTE) cellular network system, a Fourth Generation (4G) cellular network system, and a Fifth Generation (5G) cellular system.

5. The method of claim 1, wherein receiving the BWR message comprises receiving the BWR message wherein the second sub-system comprises one of the following: a Data Over Cable Service Interface Specification (DOCSIS) system, a Passive Optical Network (PON) system, a Wi-Fi system, and a cellular system.

6. The method of claim 1, wherein receiving the BWR message comprises receiving the BWR message over a layer 3 connection.

7. The method of claim 1, wherein receiving the BWR message comprises receiving the BWR message being derived from information obtained from a request-grant process carried out on the first sub-system.

8. A method comprising:
receiving, from a first sub-system by a second sub-system, a Bandwidth Report (BWR) message corresponding to first traffic that has already been received from the first sub-system by the second sub-system, wherein the BWR message comprises a summary of first grants to be scheduled by the first sub-system for transmitting for a second traffic through the first sub-system, wherein the BWR message is sent in parallel to scheduling of the first grants, and wherein the BWR message is received prior to receiving the second traffic from first sub-system;
determining, by the second sub-system, predictive grants based on the summary of the first grants in the received BWR message;
scheduling, by the second sub-system, the predictive grants for the second traffic to be received from the first sub-system;
receiving, by the second sub-system from the first sub-system, the second traffic;
and
transmitting, by the second sub-system, the second traffic based on the scheduled predictive grants.

9. The method of claim 8, wherein receiving the BWR message further comprise classifying the BWR message to one of the following: a common low latency queue and a BWR queue dedicated for BWR messages.

10. The method of claim 8, wherein receiving the BWR message comprises receiving the BWR message wherein the BWR message provides a profile of the first traffic that has already been received from the first sub-system.

11. The method of claim 8, wherein receiving the BWR message comprises receiving the BWR message wherein the first sub-system comprises one of the following: Wi-Fi Access Point (AP), an Long-Term Evolution (LTE) broadband cellular network system, a Fourth Generation (4G) broadband cellular network system, and a Fifth Generation (5G) broadband cellular system.

12. The method of claim 8, wherein receiving the BWR message comprises receiving the BWR message wherein the second sub-system comprises one of the following: a Data Over Cable Service Interface Specification (DOCSIS) system and an Ethernet Passive Optical Network (EPON) system.

13. The method of claim 8, wherein receiving the BWR message comprises receiving the BWR message over a layer 3 connection.

14. The method of claim 8, wherein receiving the BWR message comprises receiving the BWR message being derived from information obtained from a request-grant process carried out on the first sub-system.

15. A system comprising:
a memory storage; and
a processing unit coupled to the memory storage, wherein the processing unit is configured to:
receive, from a first sub-system, a Bandwidth Report (BWR) message corresponding to traffic to be received from the first sub-system, wherein the BWR message comprises a summary of first grants to be scheduled by the first sub-system for transmitting the traffic through the first sub-system, wherein the BWR message is sent in parallel to scheduling of the first grants, and wherein the BWR message is received prior to receiving the traffic from first sub-system;
schedule, based on the summary of the first grants in the BWR message, second grants for the traffic to be received from the first sub-system;
receive, from the first sub-system, the traffic; and
transmit the traffic based on the second grants.

16. The system of claim 15, wherein the processing unit being configured to receive the BWR message further comprises the processing unit being configured to classify the BWR message to one of the following: a common low latency queue and a BWR queue dedicated for BWR messages.

17. The system of claim 15, wherein BWR message provides a profile of the traffic to be received from the first sub-system.

18. The system of claim 15, wherein the first sub-system comprises one of the following: Wi-Fi Access Point (AP), an Long-Term Evolution (LTE) broadband cellular network system, a Fourth Generation (4G) cellular network system, and a Fifth Generation (5G) cellular system.

19. The system of claim 15, wherein the processing unit coupled to the memory storage is disposed in one of the following: a Data Over Cable Service Interface Specification (DOCSIS) system, an Passive Optical Network (PON) system, and a cellular system.

20. The system of claim 15, wherein the BWR message is received over a layer 3 connection.

* * * * *